(12) United States Patent
Serizawa et al.

(10) Patent No.: US 12,373,230 B2
(45) Date of Patent: Jul. 29, 2025

(54) HYPERVISOR AND CONTROL DEVICE

(71) Applicant: Hitachi Astemo, Ltd., Hitachinaka (JP)

(72) Inventors: Kazuyoshi Serizawa, Hitachinaka (JP);
Tomohito Ebina, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 697 days.

(21) Appl. No.: 17/609,158

(22) PCT Filed: Apr. 24, 2020

(86) PCT No.: PCT/JP2020/017630
§ 371 (c)(1),
(2) Date: Nov. 5, 2021

(87) PCT Pub. No.: WO2020/230586
PCT Pub. Date: Nov. 19, 2020

(65) Prior Publication Data
US 2022/0261262 A1 Aug. 18, 2022

(30) Foreign Application Priority Data
May 10, 2019 (JP) ................................ 2019-089546

(51) Int. Cl.
G06F 9/455 (2018.01)
G06F 9/48 (2006.01)
G06F 9/50 (2006.01)

(52) U.S. Cl.
CPC ............ G06F 9/45533 (2013.01); G06F 9/48 (2013.01); G06F 9/505 (2013.01)

(58) Field of Classification Search
CPC ......... G06F 9/45533; G06F 9/48; G06F 9/505
See application file for complete search history.

(56) References Cited

U.S. PATENT DOCUMENTS

| 9,912,681 B1* | 3/2018 | Ismael ................... G06F 21/55 |
| 2011/0225207 A1* | 9/2011 | Subramanian ........ H04L 45/745 |
| | | 707/E17.005 |

(Continued)

FOREIGN PATENT DOCUMENTS

| EP | 3 470 980 A1 | 4/2019 |
| JP | 2013-054534 A | 3/2013 |

(Continued)

OTHER PUBLICATIONS

International Search Report with English translation and Written Opinion issued in corresponding application No. PCT/JP2020/017630 dated Sep. 24, 2020.

(Continued)

*Primary Examiner* — April Y Blair
*Assistant Examiner* — Jonathan R Labud
(74) *Attorney, Agent, or Firm* — Foley & Lardner LLP

(57) ABSTRACT

A hypervisor of an embedded device switches CPU resources allocated to each virtual machine. CPU cores are allocated to the respective virtual machines so as to overlap each other by an adjustment margin between the guest OSs for which the number of CPU cores needs to be adjusted. For the CPU cores allocated in an overlapping manner, a CPU time is given to only one OS (the other OS is not operated). When the load between the guest OSs changes, the guest OS/virtual machine to which the CPU time is given is switched. Further, for example, control of allocating a dummy process is performed so that the guest OS to which it is not possible to allocate a CPU time due to switching does not allocate a real process.

7 Claims, 38 Drawing Sheets

(56) References Cited

U.S. PATENT DOCUMENTS

| | | | |
|---|---|---|---|
| 2012/0136697 A1* | 5/2012 | Peles | H04L 43/04 |
| | | | 705/7.38 |
| 2014/0297405 A1* | 10/2014 | Fine | G06F 11/3428 |
| | | | 705/14.53 |
| 2015/0058843 A1* | 2/2015 | Holler | G06F 9/45533 |
| | | | 718/1 |
| 2015/0355946 A1* | 12/2015 | Kang | G06F 9/5072 |
| | | | 718/104 |
| 2016/0092677 A1* | 3/2016 | Patel | G06F 21/53 |
| | | | 726/23 |
| 2017/0004002 A1* | 1/2017 | Nakamura | G06F 9/45558 |

FOREIGN PATENT DOCUMENTS

| | | |
|---|---|---|
| JP | 2013-214146 A | 10/2013 |
| JP | 2015-152987 A | 8/2015 |
| JP | 2018-116389 A | 7/2018 |

OTHER PUBLICATIONS

Office Action issued in corresponding Chinese Application No. 202080031427.1 with English translation, dated Jan. 4, 2024 (20 pages).

* cited by examiner

FIG. 3

MANAGEMENT TABLE (Hypervisor) — 122

CPU CORE – VIRTUAL CPU CORE CORRESPONDENCE TABLE — 1221

| CPU CORE 0 | VIRTUAL CPU CORE 0 | 100% |
| CPU CORE 1 | VIRTUAL CPU CORE 1 | 0% |
| CPU CORE 1 | VIRTUAL CPU CORE 2 | 100% |
| CPU CORE 2 | VIRTUAL CPU CORE 3 | 100% |

VIRTUAL CPU CORE – VM CORRESPONDENCE TABLE — 1222

| VIRTUAL CPU CORE 0 | VM1 |
| VIRTUAL CPU CORE 1 | VM1 |
| VIRTUAL CPU CORE 2 | VM2 |
| VIRTUAL CPU CORE 3 | VM2 |

FIG. 4

MANAGEMENT TABLE (OS1) — 132

VIRTUAL CPU CORE – PROCESS CORRESPONDENCE TABLE — 1321

| VIRTUAL CPU CORE 0 | 1000 (REAL PROCESS) |
| VIRTUAL CPU CORE 1 | 9000 (DUMMY PROCESS) |

DUMMY PROCESS MANAGEMENT TABLE — 1322

| 20% | VIRTUAL CPU CORE 1 | VM2 |

FIG. 9

MANAGEMENT TABLE (Hypervisor) — 122

CPU CORE - VIRTUAL CPU CORE CORRESPONDENCE TABLE — 1221

| CPU CORE 0 | VIRTUAL CPU CORE 0 | 100% |
|---|---|---|
| CPU CORE 1 | VIRTUAL CPU CORE 1 | 100% |
| CPU CORE 1 | VIRTUAL CPU CORE 2 | 0% |
| CPU CORE 2 | VIRTUAL CPU CORE 3 | 100% |

VIRTUAL CPU CORE - VM CORRESPONDENCE TABLE — 1222

| VIRTUAL CPU CORE 0 | VM1 |
|---|---|
| VIRTUAL CPU CORE 1 | VM1 |
| VIRTUAL CPU CORE 2 | VM2 |
| VIRTUAL CPU CORE 3 | VM2 |

FIG. 15

MANAGEMENT TABLE (Hypervisor) — 122

CPU CORE-VIRTUAL CPU CORE CORRESPONDENCE TABLE — 1221

| CPU CORE 0 | VIRTUAL CPU CORE 0 | 100% |
|---|---|---|
| CPU CORE 1 | VIRTUAL CPU CORE 1 | 0% |
| CPU CORE 2 | VIRTUAL CPU CORE 2 | 100% |
| CPU CORE 1 | VIRTUAL CPU CORE 3 | 0% |
| CPU CORE 3 | VIRTUAL CPU CORE 4 | 0% |
| CPU CORE 4 | VIRTUAL CPU CORE 5 | 100% |
| CPU CORE 1 | VIRTUAL CPU CORE 6 | 100% |
| CPU CORE 3 | VIRTUAL CPU CORE 7 | 100% |

VIRTUAL CPU CORE-VM CORRESPONDENCE TABLE — 1222

| VIRTUAL CPU CORE 0 | VM1 |
|---|---|
| VIRTUAL CPU CORE 1 | VM1 |
| VIRTUAL CPU CORE 2 | VM2 |
| VIRTUAL CPU CORE 3 | VM2 |
| VIRTUAL CPU CORE 4 | VM2 |
| VIRTUAL CPU CORE 5 | VM3 |
| VIRTUAL CPU CORE 6 | VM3 |
| VIRTUAL CPU CORE 7 | VM3 |

FIG. 20

MANAGEMENT TABLE (Hypervisor) — 122

CPU CORE - VIRTUAL CPU CORE CORRESPONDENCE TABLE — 1221

| CPU CORE 0 | VIRTUAL CPU CORE 0 | 100% |
|---|---|---|
| CPU CORE 1 | VIRTUAL CPU CORE 1 | 100% |
| CPU CORE 2 | VIRTUAL CPU CORE 2 | 100% |
| CPU CORE 1 | VIRTUAL CPU CORE 3 | 0% |
| CPU CORE 3 | VIRTUAL CPU CORE 4 | 0% |
| CPU CORE 4 | VIRTUAL CPU CORE 5 | 100% |
| CPU CORE 1 | VIRTUAL CPU CORE 6 | 0% |
| CPU CORE 3 | VIRTUAL CPU CORE 7 | 100% |

VIRTUAL CPU CORE - VM CORRESPONDENCE TABLE — 1222

| VIRTUAL CPU CORE 0 | VM1 |
|---|---|
| VIRTUAL CPU CORE 1 | VM1 |
| VIRTUAL CPU CORE 2 | VM2 |
| VIRTUAL CPU CORE 3 | VM2 |
| VIRTUAL CPU CORE 4 | VM2 |
| VIRTUAL CPU CORE 5 | VM3 |
| VIRTUAL CPU CORE 6 | VM3 |
| VIRTUAL CPU CORE 7 | VM3 |

FIG. 36

MANAGEMENT TABLE (Hypervisor) — 122

CPU CORE – VIRTUAL CPU CORE CORRESPONDENCE TABLE — 1221

| CPU CORE 0 | VIRTUAL CPU CORE 0 | 100% |
| --- | --- | --- |
| — | VIRTUAL CPU CORE 1 | 0% |
| CPU CORE 2 | VIRTUAL CPU CORE 2 | 100% |
| — | VIRTUAL CPU CORE 3 | 0% |
| CPU CORE 3 | VIRTUAL CPU CORE 4 | 0% |
| CPU CORE 4 | VIRTUAL CPU CORE 5 | 100% |
| — | VIRTUAL CPU CORE 6 | 100% |
| CPU CORE 3 | VIRTUAL CPU CORE 7 | 100% |

VIRTUAL CPU CORE – VM CORRESPONDENCE TABLE — 1222

| VIRTUAL CPU CORE 0 | VM1 |
| --- | --- |
| VIRTUAL CPU CORE 1 | VM1 |
| VIRTUAL CPU CORE 2 | VM2 |
| VIRTUAL CPU CORE 3 | VM2 |
| VIRTUAL CPU CORE 4 | VM2 |
| VIRTUAL CPU CORE 5 | VM3 |
| VIRTUAL CPU CORE 6 | VM3 |
| VIRTUAL CPU CORE 7 | VM3 |

FIG. 42

MANAGEMENT TABLE (Hypervisor) — 122

CPU CORE-VIRTUAL CPU CORE CORRESPONDENCE TABLE — 1221

| CPU CORE 0 | VIRTUAL CPU CORE 0 | 100% |
|---|---|---|
| CPU CORE 3 | VIRTUAL CPU CORE 1 | 100% |
| CPU CORE 2 | VIRTUAL CPU CORE 2 | 100% |
| CPU CORE 3 | VIRTUAL CPU CORE 3 | 0% |
| — | VIRTUAL CPU CORE 4 | 0% |
| CPU CORE 4 | VIRTUAL CPU CORE 5 | 100% |
| CPU CORE 3 | VIRTUAL CPU CORE 6 | 0% |
| — | VIRTUAL CPU CORE 7 | 0% |

VIRTUAL CPU CORE-VM CORRESPONDENCE TABLE — 1222

| VIRTUAL CPU CORE 0 | VM1 |
|---|---|
| VIRTUAL CPU CORE 1 | VM1 |
| VIRTUAL CPU CORE 2 | VM2 |
| VIRTUAL CPU CORE 3 | VM2 |
| VIRTUAL CPU CORE 4 | VM2 |
| VIRTUAL CPU CORE 5 | VM3 |
| VIRTUAL CPU CORE 6 | VM3 |
| VIRTUAL CPU CORE 7 | VM3 |

HYPERVISOR AND CONTROL DEVICE

TECHNICAL FIELD

The present invention relates to a technology of a hypervisor and a control device, for example.

BACKGROUND ART

PTL 1 below discloses an example of a method of causing a hypervisor to allocate CPU resources to each virtual machine. In PTL 1, the hypervisor calculates the use rate of the CPU allocated to a virtual machine based on the virtual machine, a guest OS operating on the virtual machine, and an HLT command from the guest OS, and determines the length of a time in which the CPU is allocated to the virtual machine, based on the calculated use rate of the CPU.

CITATION LIST

Patent Literature

PTL 1: JP 2013-214146 A

SUMMARY OF INVENTION

Technical Problem

When a hypervisor is used in an embedded device, real-time performance is secured by allocating a guest OS of one virtual machine to one CPU core. In the method in PTL 1, guest OSs of a plurality of virtual machines are allocated to one CPU core. Therefore, a time during which it is not possible for the CPU core to be allocated to the guest OS of the virtual machine occurs, and it is not possible to secure the real-time performance.

The present invention has been made in view of the above points, and an object of the present invention is to provide a hypervisor capable of achieving both tracking of a load change between guest OSs and securing of real-time performance, and a control device having the hypervisor.

Solution to Problem

To solve the above problems, according to the present invention, a hypervisor allocates CPU cores to the respective virtual machines so as to overlap each other by an adjustment margin between guest OSs for which the number of CPU cores needs to be adjusted, gives a CPU time is given to only one OS for the CPU cores allocated in an overlapping manner, and switches the guest OS to which the CPU time is given, in accordance with a change in load between the guest OSs.

In addition, when the guest OS is switched, control is performed to allocate a dummy process to the guest OS to which it is not possible to give a CPU time, so that a real process is not allocated.

Advantageous Effects of Invention

According to the present invention, it is possible to achieve both tracking of a load change between the guest OSs and the securing of real-time performance.

Further features relating to the present invention will become apparent from the description of the specification and the accompanying drawings. In addition, objects, configurations, and advantageous effects other than those described above will be clarified by the descriptions of the following embodiments.

BRIEF DESCRIPTION OF DRAWINGS

FIG. 3 is a configuration diagram illustrating a management table 122 in a hypervisor 12 in the first embodiment.

FIG. 4 is a configuration diagram illustrating a management table 132 in an OS 131 in the first embodiment.

FIG. 9 is a configuration diagram illustrating the management table 122 in the hypervisor 12 in the first embodiment.

FIG. 15 is a configuration diagram illustrating a management table 122 in a hypervisor 12 in the second embodiment.

FIG. 20 is a configuration diagram illustrating the management table 122 in the hypervisor 12 in the second embodiment.

FIG. 36 is a configuration diagram illustrating a management table 122 in the hypervisor 12 in the fifth embodiment.

FIG. 42 is a configuration diagram illustrating the management table 122 in the hypervisor 12 in the fifth embodiment.

DESCRIPTION OF EMBODIMENTS

Hereinafter, embodiments of the present invention will be described with reference to the drawings.

First Embodiment

Figure 1:
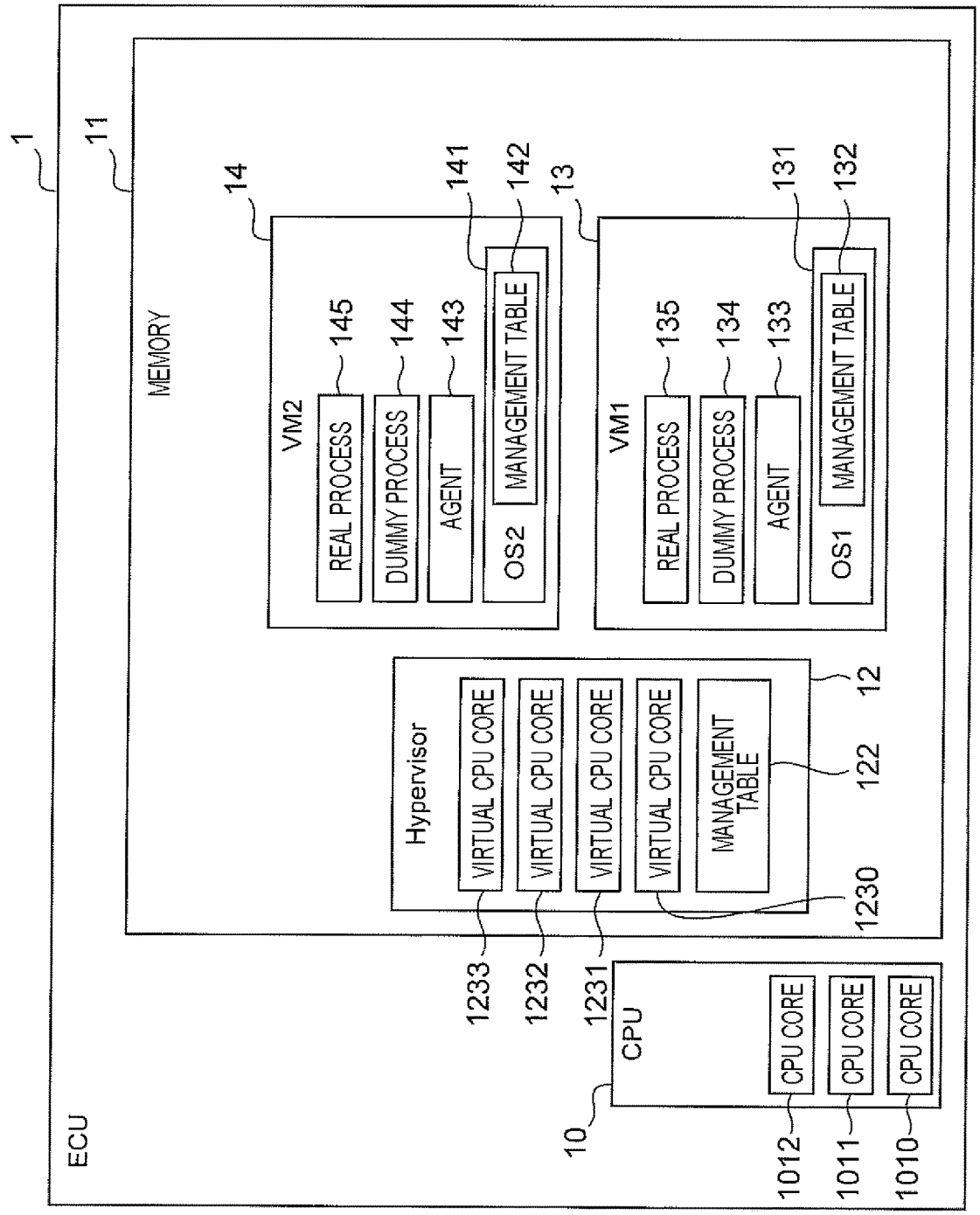
FIG. 1 is a diagram illustrating an overall configuration according to a first embodiment.

FIG. 1 is a diagram illustrating an overall configuration of a first embodiment of the present invention.

In the present embodiment, a control device is configured by an ECU 1. The ECU 1 is, for example, an in-vehicle computer that is mounted on an automobile and used for the advanced driver assistance system (ADAS) and automatic parking control.

The ECU 1 includes an arithmetic processing device (CPU) 10 and a memory (storage device) 11 as hardware. The CPU 10 and the memory 11 are connected to each other via an internal bus or an adapter in the ECU 1. The CPU 10 includes a plurality of CPU cores. In the present embodiment, the CPU 10 includes three CPU cores (CPU cores 0 to 2) 1010 to 1012.

The memory 11 includes a hypervisor 12 and a plurality of virtual machines (VM1 and VM2) 13 and 14. The hypervisor and the virtual machines (VM1 and VM2) 13 and 14 are programs of virtualization software stored in the memory 11. The hypervisor 12 is an embedded hypervisor and includes a management table 122 and a plurality of virtual CPU cores. As the virtual CPU cores, four virtual CPU cores (CPU cores 0 to 3) 1230 to 1233 are provided.

In the virtual machine, two virtual machines, the virtual machine (VM1) 13 and the virtual machine (VM2) 14, are provided. The virtual machine (VM1) 13 includes programs of an OS (OS1) 131, an agent 133, a dummy process 134, and a real process 135. The OS (OS1) 131 is a so-called guest OS and has a management table 132.

The virtual machine (VM2) 14 has a configuration similar to the configuration of the virtual machine (VM1) 13, and includes programs of an OS (OS2) 141, an agent 143, a dummy process 144, and a real process 145. The OS (OS2) 141 is a guest OS and has a management table 142.

The three CPU cores 1010 to 1012 (CPU cores 0 to 2) execute the programs stored in the memory 11. In the following description, a program may be described as a subject, but the execution subject is just the CPU cores 1010 to 1012 (CPU cores 0 to 2). Next, the function of the programs stored in the memory 11 will be described with reference to FIGS. 2 and 8.

Figure 2:
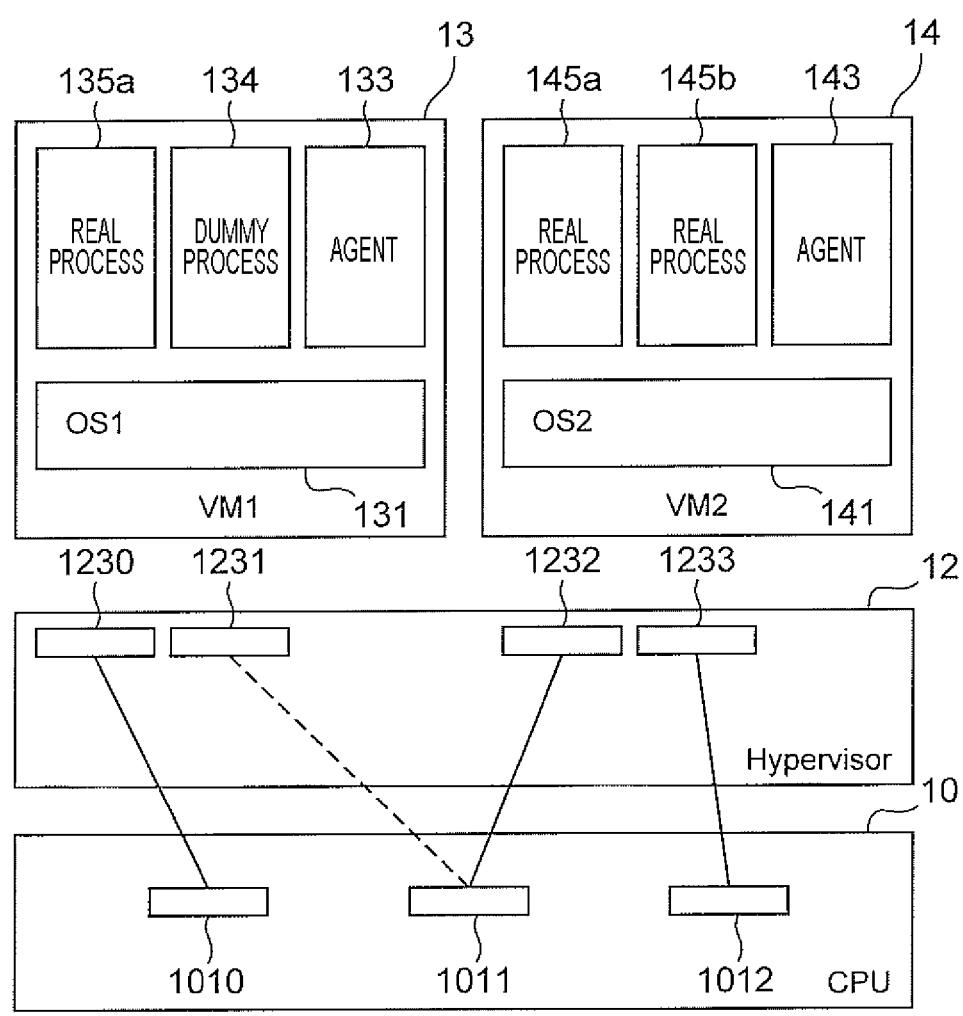
FIG. 2 is a diagram illustrating a functional configuration in the first embodiment.
Figure 8:
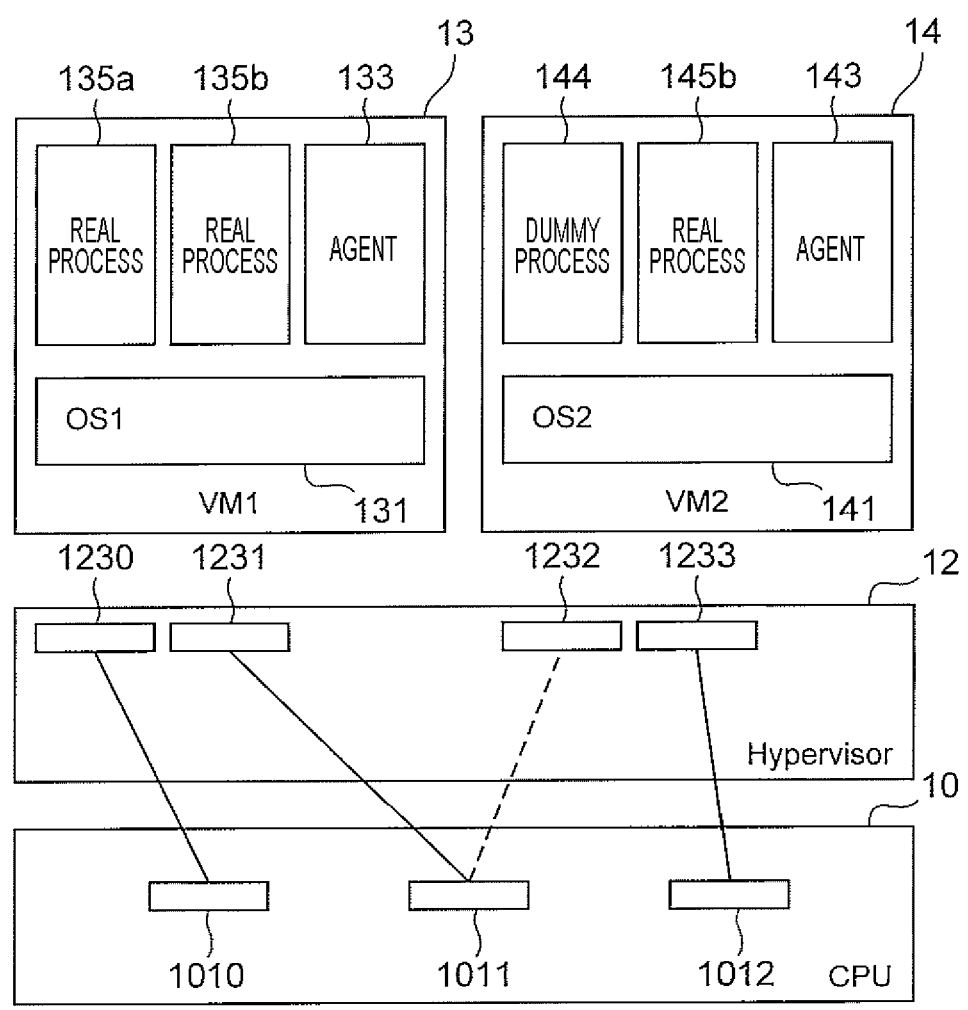
FIG. 8 is a diagram illustrating the functional configuration in the first embodiment.

FIGS. 2 and 8 are diagrams illustrating functional configurations of the control device according to the first embodiment of the present invention. FIG. 2 illustrates a state in which the virtual machine (VM1) 13 has a low load and the virtual machine (VM1) 13 does not substantially use the CPU core 1011. FIG. 8 illustrates a state in which the virtual machine (VM2) 14 has a low load and the virtual machine (VM2) 14 does not substantially use the CPU core 1011.

The hypervisor 12 performs processing of allocating CPU cores to the respective virtual machines so as to overlap each other by an adjustment margin between guest OSs for which the number of CPU cores needs to be adjusted, giving a CPU time is given to only one OS for the CPU cores allocated in an overlapping manner, and switching the guest OS to which the CPU time is given, in accordance with a change in load between the guest OSs. When switching the guest OS, the hypervisor perform control to allocate a dummy process to the guest OS to which it is not possible to give a CPU time, so that a real process is not allocated.

FIG. 2 illustrates a state in which a real process 135a and the dummy process 134 are executed in the virtual machine (VM1) 13, and real processes 145a and 145b are executed in the virtual machine (VM2) 14. Then, FIG. 8 illustrates a state in which the real processes 135a and 135b are executed in the virtual machine (VM1) 13, and the dummy process 144 and a real process 145b are executed in the virtual machine (VM2) 14.

The hypervisor 12 virtualizes the program in the virtual machine (VM1) 13 as if the virtual CPU cores (CPU Cores 0 and 1) 1230 and 1231 execute the program, and virtualizes the program in the virtual machine (VM2) 14 as if the virtual CPU cores (virtual CPU cores 2 and 3) 1232 and 1233 execute the program.

The hypervisor 12 causes the virtual CPU core (virtual CPU core 0) 1230 to correspond to the CPU core (CPU core 0) 1010, and causes the virtual CPU core (virtual CPU core 3) 1233 to correspond to the CPU core (CPU core 2) 1012. The hypervisor causes both the virtual CPU core (virtual CPU core 1) 1231 and the virtual CPU core (virtual CPU core 2) 1232 to correspond to the CPU core (CPU core 1) 1011.

The hypervisor 12 actually causes the CPU core 1010 (CPU core 0) to execute the program which is executed by the virtual CPU core 1230 (virtual CPU core 0). Then, for example, as illustrated in FIG. 2, the hypervisor actually causes the CPU cores (CPU core 1 and CPU core 2) 1011 and 1012 to execute the programs executed by the virtual CPU cores (virtual CPU cores 2 and 3) 1232 and 1233.

The hypervisor 12 associates a plurality of virtual machines (VM1 and VM2) with one first CPU core (CPU core 1011) among the plurality of CPU cores. Then, the hypervisor allocates the use time of the first CPU core to only the one first virtual machine (VM2) among the plurality of virtual machines.

For example, as illustrated in FIG. 2, the hypervisor 12 actually does not cause the CPU core (CPU core 1) 1011 to execute a program intended to be executed by the virtual CPU core (virtual CPU core 1) 1231, as described later. It is assumed that the OS (OS1) 131 causes the virtual CPU core (virtual CPU core 0) 1230 to execute the real process 135*a*, and causes the virtual CPU core (virtual CPU core 1) 1231 to execute the dummy process 134. However, in practice, since the hypervisor 12 does not cause the program on the virtual CPU core (virtual CPU core 1) 1231 to be executed, the dummy process 134 is not executed.

The relation between the real processes 145*a* and 145*b*, and the virtual CPU cores (virtual CPU cores 2 and 3) 1232 and 1233 and the OS (OS2) 141 is similar to the relation between the real process 135*a*, and the virtual CPU core (virtual CPU core 0) 1230 and the OS (OS1) 131. While the real processes 135 and 145 are not operating in the respective virtual machines (VM1 and VM2), the agents 133 and 143 cause the virtual CPU cores on which the respective OSs (OS1 and OS2) do not operate the real processes to execute the real processes. For example, the OS (OS1) 131 causes the virtual CPU core (virtual CPU core 0) 1230 to execute the agent 133.

The real processes 135*a*, 145*a*, and 145*b* can operate to occupy the corresponding CPU cores 1010, 1011, and 1012 (CPU cores 0, 1, and 2), respectively. The dummy process 134 is not executed in the corresponding CPU core (CPU core 1) 1011. Since the dummy process 134 is dummy, there is no problem even if the dummy process is not executed.

The above correspondence relation is defined by the tables in FIGS. 3 to 5 and FIGS. 9 to 11 described below. That is, the values in the tables illustrated in FIGS. 3 to 5 indicate the state illustrated in FIG. 2, and the values in the tables illustrated in FIGS. 9 to 11 indicate the state illustrated in FIG. 8.

FIG. 3 is a configuration diagram illustrating the management table 122 in the hypervisor 12 in the first embodiment. The management table 122 in the hypervisor 12 includes a CPU core-virtual CPU core correspondence table 1221 and a virtual CPU core-VM correspondence table 1222.

The CPU core-virtual CPU core correspondence table 1221 shows a correspondence relation between the CPU cores 1010 to 1012 (CPU cores 0 to 2) and the virtual CPU cores 1230 to 1233 (virtual CPU cores 0 to 3), and an allocation rate of the corresponding virtual CPU core, that is, how much CPU time (CPU use time) the CPU core uses to execute the program on the virtual CPU core. For example, the CPU core (CPU core 0) 1010 is associated with the virtual CPU core (virtual CPU core 0) 1230. The CPU core 1010 executes the program on the virtual CPU core 1230 by using the CPU time of 100%. Similarly, the CPU core (CPU core 2) 1012 is associated with the virtual CPU core (virtual CPU core 3) 1233. The CPU core 1012 executes the program on the virtual CPU core 1233 by using the CPU time of 100%.

The CPU core (CPU core 1) 1011 is associated with the virtual CPU core (virtual CPU core 1) 1231 and is also associated with the virtual CPU core (virtual CPU core 2) 1232. The CPU core 1011 executes the program on the virtual CPU core (virtual CPU core 2) 1232 by using the CPU time of 100%. The CPU core 1011 executes the program on the virtual CPU core (virtual CPU core 1) 1231 by using the CPU time of 0% (that is, does not execute the program).

The virtual CPU core-VM correspondence table 1222 shows the correspondence between the virtual CPU cores (virtual CPU cores 0 to 3) and the virtual machines (VM1 and VM2). The example illustrated in FIG. 3 illustrates that the virtual CPU cores (virtual CPU cores 0 and 1) 1230 and 1231 are associated with the virtual machine (VM1) 13, and the virtual CPU cores 1232 and 1233 are associated with the virtual machine (VM2) 14. That is, the virtual CPU cores 1230 and 1231 (CPU Cores 0 and 1) execute the program in the virtual machine (VM1) 13, and the virtual CPU cores (virtual CPU cores 2 and 3) 1232 and 1233 execute the program in the virtual machine (VM2) 14.

FIG. 4 is a configuration diagram illustrating the management table 132 in the OS 131 in the first embodiment. The management table 132 in the virtual machine (VM1) 13 has a virtual CPU core-process correspondence table 1321 and a dummy process management table 1322.

The virtual CPU core-process correspondence table 1321 shows which process is executed by which virtual CPU core, that is, a process to be executed and a virtual CPU core that executes the process. The example illustrated in FIG. 4 illustrates that a process 1000 (real process 135*a*) is executed by the virtual CPU core (virtual CPU core 0) 1230 and a process 9000 (dummy process 134) is executed by the virtual CPU core (virtual CPU core 1) 1231.

The dummy process management table 1322 includes information of a threshold value (%) of the CPU use rate to be described later, a virtual CPU core number shared with another virtual machine (OS), and an identifier of a virtual machine that shares the virtual CPU core. Details of the dummy process management table 1322 will be described later in the description with reference to the flowchart in FIG. 6.

Figure 5:
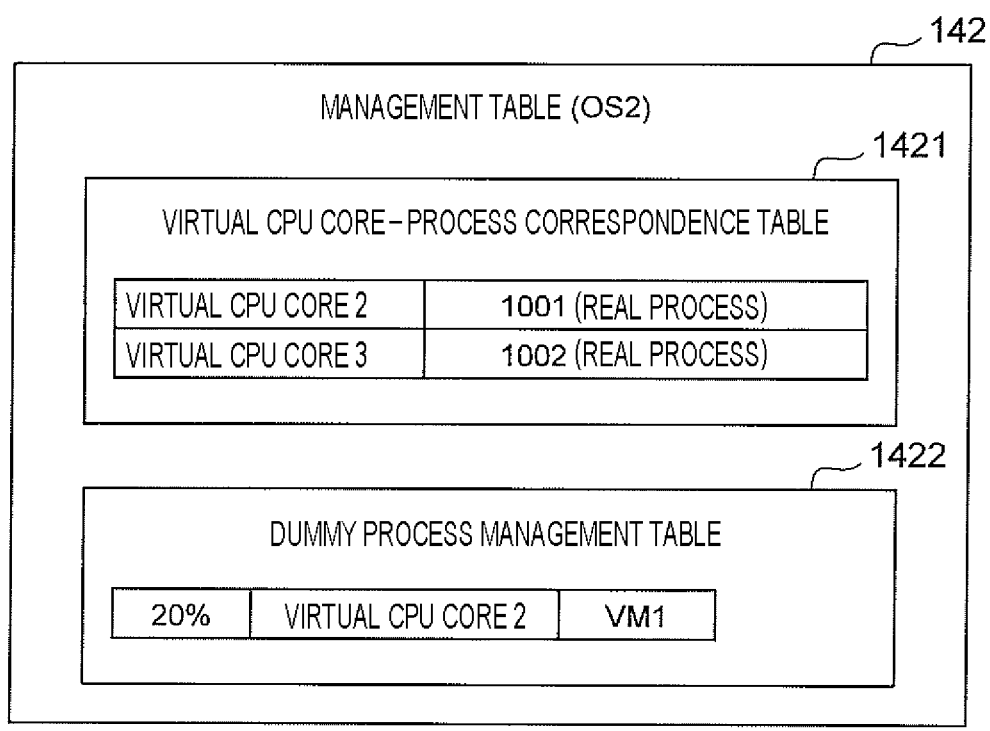
FIG. 5 is a configuration diagram illustrating a management table 142 in an OS 141 in the first embodiment.

FIG. 5 is a configuration diagram illustrating the management table 142 in the OS 141 in the first embodiment. The management table 142 in the virtual machine (VM2) 14 includes a virtual CPU core-process correspondence table 1421 and a dummy process management table 1422. The configuration of the management table 142 is similar to the configuration of the management table 132 except that the target of the management target is the OS (OS2) 141.

In the example illustrated in FIG. 5, the virtual CPU core-process correspondence table 1421 defines that a process 1001 (real process 145*a*) is executed by the virtual CPU core (virtual CPU core 2) 1232 and a process 1002 (real process 145*b*) is executed by the virtual CPU core (virtual CPU core 3) 1233. The content of the dummy process management table 1422 will be described together with the description of the dummy process management table 1322 in FIG. 4 in the following description with reference to the flowchart in FIG. 6.

FIGS. 2 to 5 illustrate a state in which the virtual machine (VM1) 13 has a low load and the virtual machine (VM1) 13 does not substantially use the CPU core 1011, and FIGS. 8 to 11 illustrate a state in which the virtual machine (VM2) 14 has a low load and the virtual machine (VM2) 14 does not substantially use the CPU core 1011 (FIG. 2 and FIG. 8, FIG. 3 and FIG. 9, FIG. 4 and FIG. 10, and FIG. 5 and FIG. 11 correspond to each other, and the respective structures in the drawings are the same).

Figure 6:
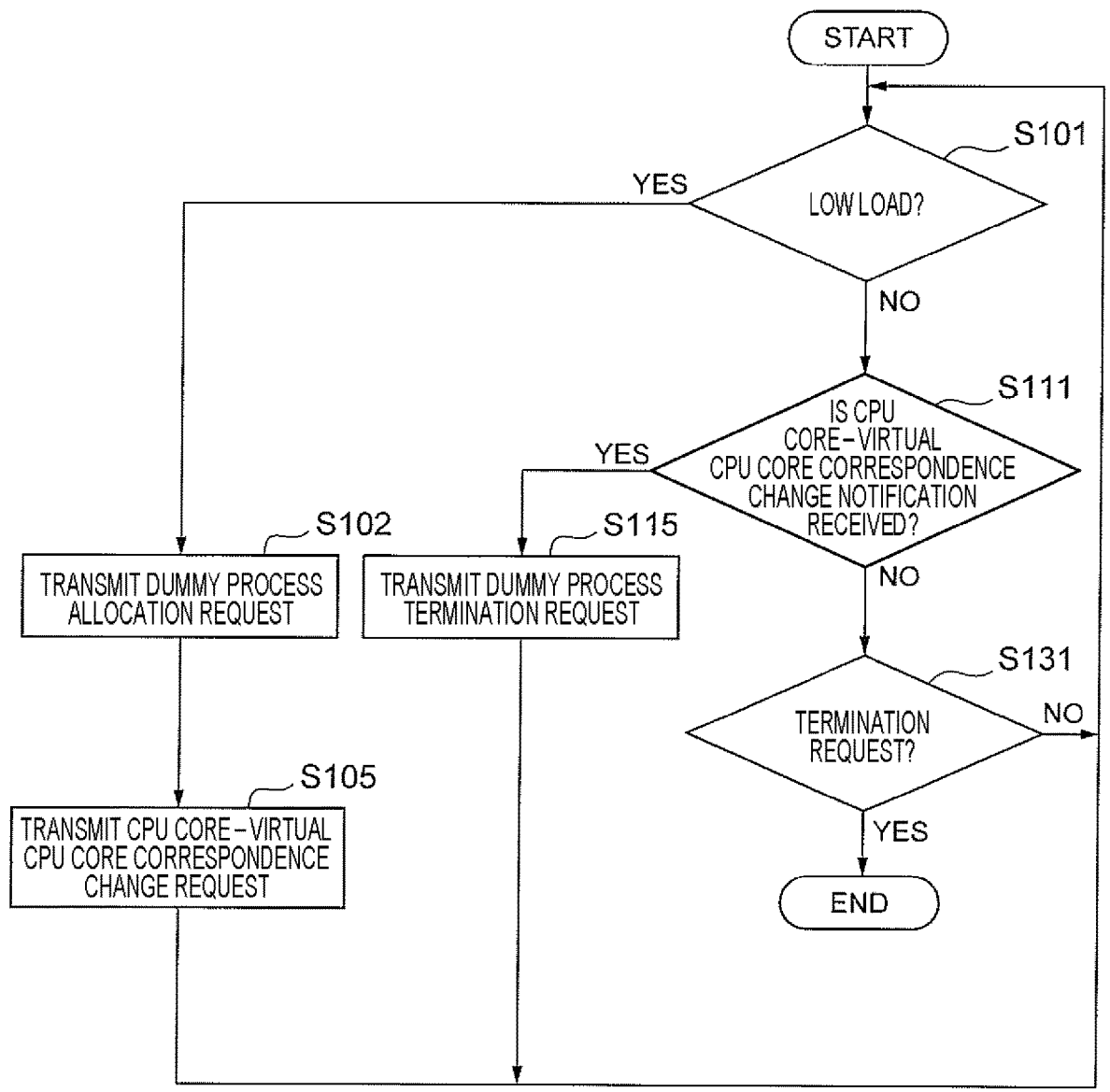
FIG. 6 is a flowchart illustrating processing contents of agents 133 and 143 in the first embodiment.

FIG. 6 is a flowchart illustrating processing contents of the agents 133 and 143 in the first embodiment. When the load of each of the virtual machines (VM1 and VM2) 13 and 14 is low, the agents 133 and 143 of the virtual machines (VM1 and VM2) 13 and 14 operate a dummy process on a virtual CPU core shared with the OS of another virtual machine. Then, the agents 133 and 143 notify an agent on the OS of another virtual machine that the CPU core corresponding to such a virtual CPU core is available. Information on the notification destination OS at this time and a threshold value for determining whether or not the load is low is stored in the dummy process management tables 1322 and 1422 illustrated in FIGS. 4 and 5.

The agents 133 and 143 determine whether the loads of the virtual machines (VM1 and VM2) 13 and 14 are low (Step S101). At this time, the agents 133 and 143 calculate the sums of the use rates of all the virtual CPU cores respectively associated with the virtual machines (VM1 and VM2) 13 and 14, and compare the sums to the threshold values of the dummy process management tables 1322 and 1422. When the sums of the use rates are lower than the threshold values, the agents 133 and 143 determines that the load is low (YES in Step S101), and transmit a dummy process allocation request to the virtual CPU core numbers in the dummy process management tables 1322 and 1422, which correspond to the OSs 131 and 141 (Step S102).

For example, in the case of the virtual machine (VM1) 13, the two virtual CPU cores (virtual CPU cores 0 and 1) 1230 and 1231 are associated with the virtual machine (VM1) 13. Thus, the sum of the use rates of the virtual CPU cores in the virtual machine (VM1) 13 has a value up to 200% at the maximum. The agent 133 of the virtual machine (VM1) 13 compares the sum of the use rates (sum of the use rates of the two virtual CPU cores (virtual CPU cores 0 and 1) 1230 and 1231) with the threshold value of 20% defined in the dummy process management table 1322. When the sum of the use rates is lower than the threshold value, the agent 133 determines that the load of the virtual machine (VM1) 13 is low. Similarly, whether the load is low is determined for the virtual machine (VM2) 14.

For example, when the load of the virtual machine (VM2) 14 has changed to a low load from the state illustrated in FIGS. 2 to 5, if the agent 143 of the virtual machine (VM2) 14 determines that the load of the virtual machine (VM2) 14 has changed to a low load, the agent 143 designates the virtual CPU core (virtual CPU core 2) 1232 in the dummy process management table 1422 and transmits a dummy process allocation request to the OS (OS2) 141 (Step S102). When receiving the dummy process allocation request from the agent 143, the OS (OS2) 141 allocates the dummy process 144 to the virtual CPU core (virtual CPU core 2) 1232.

Figure 11:
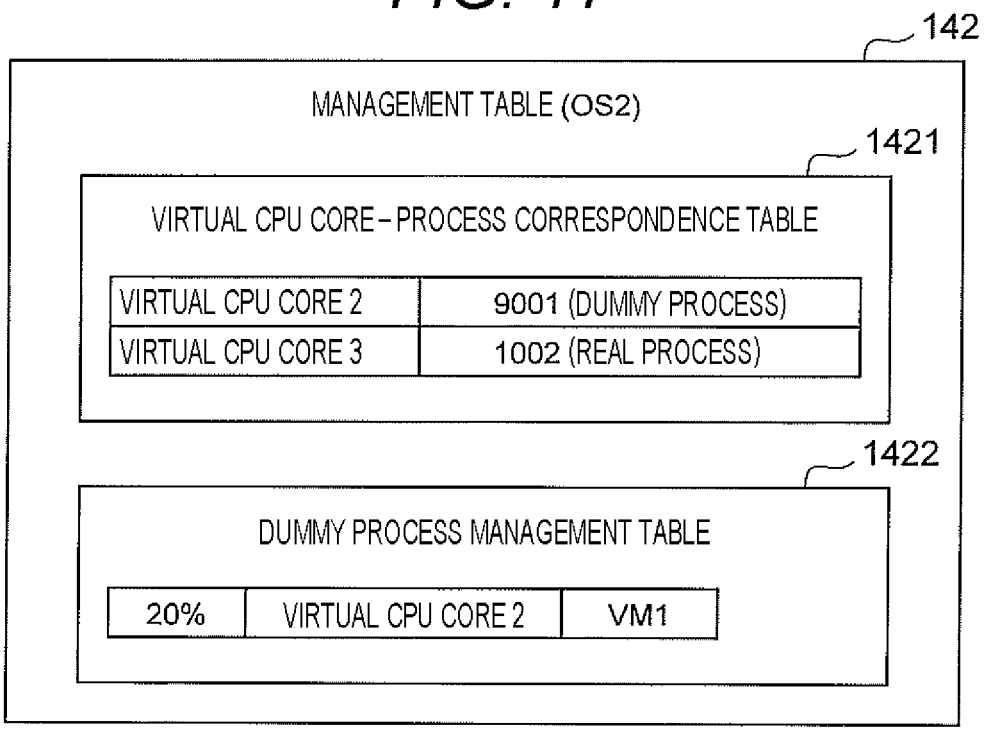
FIG. 11 is a configuration diagram illustrating the management table 142 in the OS 141 in the first embodiment.

When the OS (OS2) 141 allocates the dummy process 144, the management table 142 in the OS (OS2) 141 has the correspondence illustrated in FIG. 11. That is, the correspondence is changed so that a process 9001 (dummy process 144) is executed by the virtual CPU core (virtual CPU core 2) 1232 and a process 1002 (real process 145b) is executed by the virtual CPU core (virtual CPU core 3) 1233. Further, the agent 143 of the virtual machine (VM2) 14 transmits a CPU core-virtual CPU core correspondence change request to the hypervisor 12 (Step S105), and returns to the beginning of the program. The CPU core-virtual CPU core correspondence change request is a signal for requesting switching of the virtual machine to which the use time of the CPU core is exclusively given, when the ratio of the load of the virtual machine has changed.

When transmitting the CPU core-virtual CPU core correspondence change request to the hypervisor 12, the agent 143 transmits, to the hypervisor 12, an identifier VM1 of the virtual machine that shares the virtual CPU core, which is stored in the dummy process management table 1422, and the information on the virtual CPU core number (virtual CPU core 2) stored in the same dummy process management table 1422 together.

As described above, when not determining that the load of the virtual machines (VM1 and VM2) 13 and 14 is low (NO in Step S101), each of the agents 133 and 143 determines whether or not a CPU core-virtual CPU core correspondence change notification has been received from the hypervisor 12 (Step S111). When the CPU core-virtual CPU core correspondence change notification has been received in Step S111 (YES in Step S111), each of the agents 133 and 143 transmits a dummy process termination request to the OSs (OS1 and OS2) 131 and 141 (Step S115), and returns to the beginning of the program.

When the CPU core-virtual CPU core correspondence change notification has not been received in Step S111 (NO in Step S111), the CPU 10 determines whether a termination request has been received from the OSs (OS1 and OS2) 131 and 141 (Step S131). When the termination request has been received from the OSs (OS1 and OS2) 131 and 141, the program is terminated (YES in Step S131). When the termination request is not received (NO in Step S131), the process returns to the beginning of the program.

For example, when the agent 133 of the virtual machine (VM1) 13 has received the CPU core-virtual CPU core correspondence change notification from the agent 143 of the virtual machine (VM2) 14 via the hypervisor 12 (YES in Step S111), the agent 133 transmits a dummy process termination request to the OS (OS1) 131 in Step S115. When the dummy process is terminated, the OS (OS1) 131 sets the real process 135b to be executable, allocates a process 1003 (real process 135b) to the virtual CPU core (virtual CPU core 1) 1231, and starts the execution. The management table 132 after the start of the process has the configuration illustrated in FIG. 10.

Figure 7:
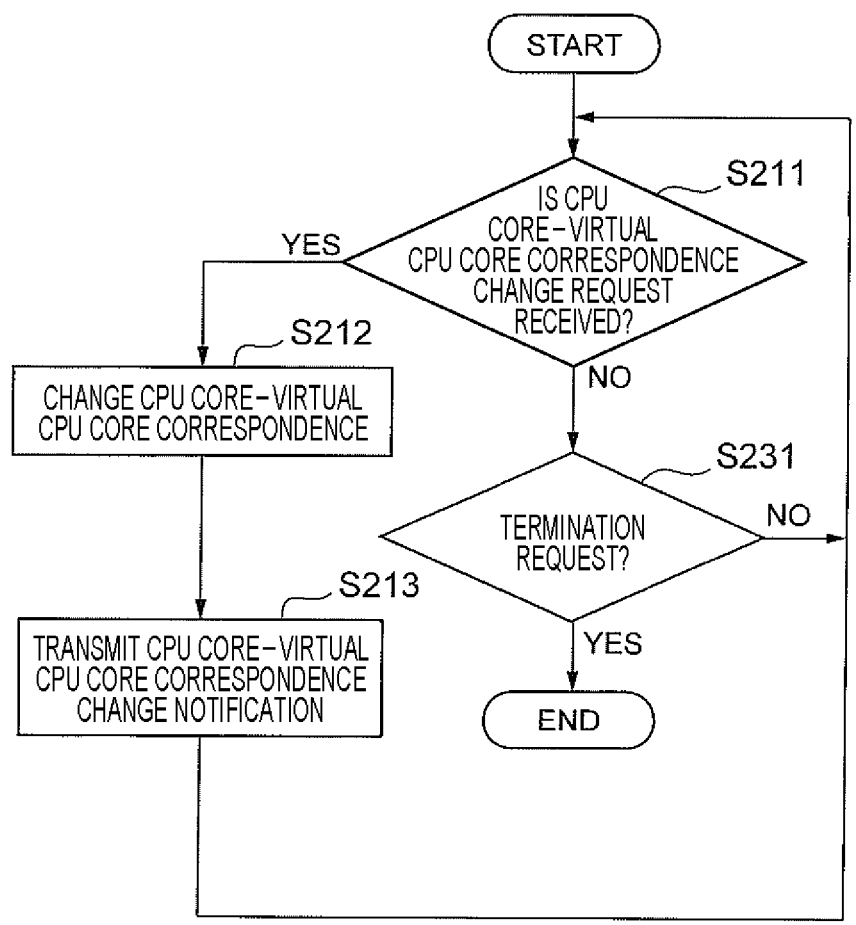
FIG. 7 is a flowchart illustrating processing contents of the hypervisor 12 in the first embodiment.

FIG. 7 is a flowchart illustrating processing contents of the hypervisor 12 in the first embodiment.

When the ratios of the loads of the plurality of virtual machines have changed, the hypervisor 12 determines whether or not a correspondence change request for switching the virtual machine to which the use time of the first CPU core is exclusively given is received. When the CPU core-virtual CPU core correspondence change request is received, the hypervisor performs processing of preventing allocation of a certain process to the virtual CPU core corresponding to the CPU core of the OS in the virtual machine to which the use time of the CPU core is not allocated. The hypervisor performs such processing before switching of the virtual machine.

The hypervisor 12 determines whether the CPU core-virtual CPU core correspondence change request is received from either of the agents 133 and 143 (Step S211). When the CPU core-virtual CPU core correspondence change request is received (YES in Step S211), the hypervisor searches CPU core-virtual CPU core correspondence table 1221 for the virtual CPU core number simultaneously transmitted, and changes the allocation rate of the hit virtual CPU core from 100% to 0%.

The hypervisor detects the virtual CPU core associated with the identifier of the virtual machine that is associated with the same CPU core as the CPU core associated with the virtual CPU core and shares the virtual CPU core simultaneously transmitted. The hypervisor detects such a virtual CPU by collating with the virtual CPU core-VM correspondence table 1222. Then, the hypervisor changes the allocation rate of the detected virtual CPU core from 0% to 100% (Step S212).

Further, the CPU 10 searches the virtual CPU core-VM correspondence table 1222 for the virtual machine associated with the virtual CPU core having the allocation rate that has been changed to 100%. Then, the CPU 10 transmits a CPU core-virtual CPU core correspondence change notification to the agent 133 or 143 on the hit virtual machine (Step S213), and returns to the beginning of the program.

Here, the processing contents of Steps S212 to S213 will be described by using, as an example, a case where the CPU core-virtual CPU core correspondence change request is received from the agent 143. When receiving the CPU core-virtual CPU core correspondence change request from the agent 143, the hypervisor 12 searches the CPU core-virtual CPU core correspondence table 1221 for the virtual CPU core number (virtual CPU core (virtual CPU core 2) 1232) simultaneously received, and changes the allocation rate of the virtual CPU core having the virtual CPU core number from 100% to 0%.

Further, the hypervisor 12 changes the allocation rate of the virtual CPU core (virtual CPU core 1) 1231 which is associated with the CPU core (CPU core 1) 1011 associated with the virtual CPU core number (virtual CPU core (virtual CPU core 2) 1232) simultaneously received and is associated with the identifier of the virtual machine that shares the virtual CPU core simultaneously transmitted, from 0% to 100%. The management table 122 after the change has the configuration illustrated in FIG. 9.

When not receiving the CPU core-virtual CPU core correspondence change request in Step S211 (NO in Step S211), the hypervisor 12 determines whether or not a termination request has been received from a management program (not illustrated). When the termination request has been received, the hypervisor terminates the process (YES in Step S231). When the termination request has not been received (NO in Step S231), the hypervisor returns to the beginning of the program.

Figure 10:
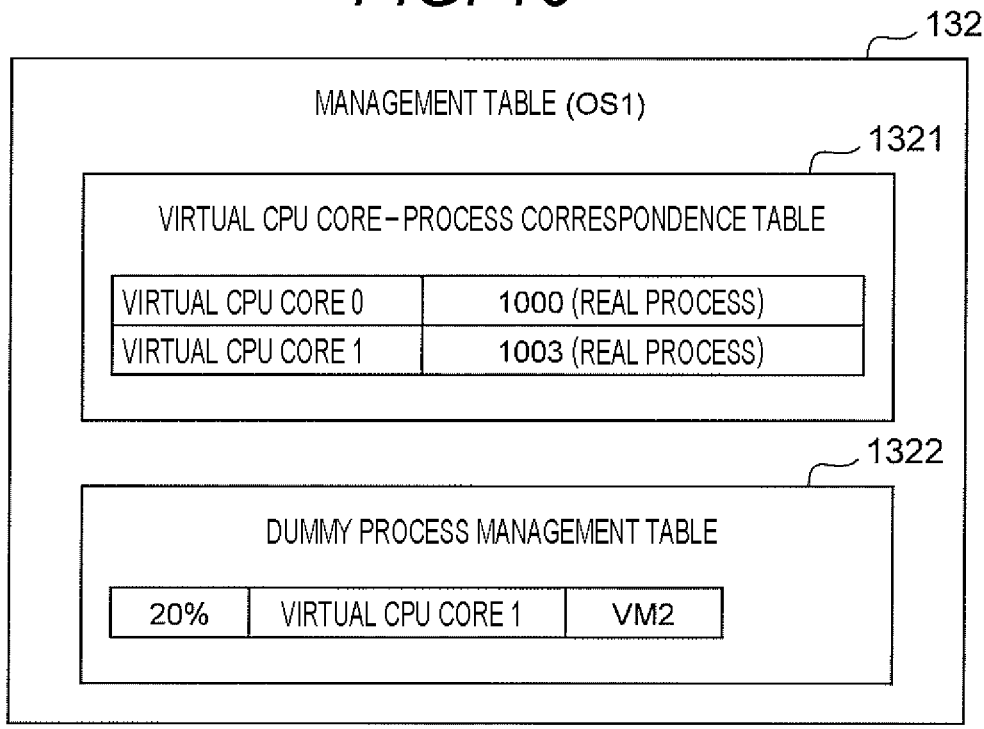
FIG. 10 is a configuration diagram illustrating the management table 132 in the OS 131 in the first embodiment.
Figure 12:
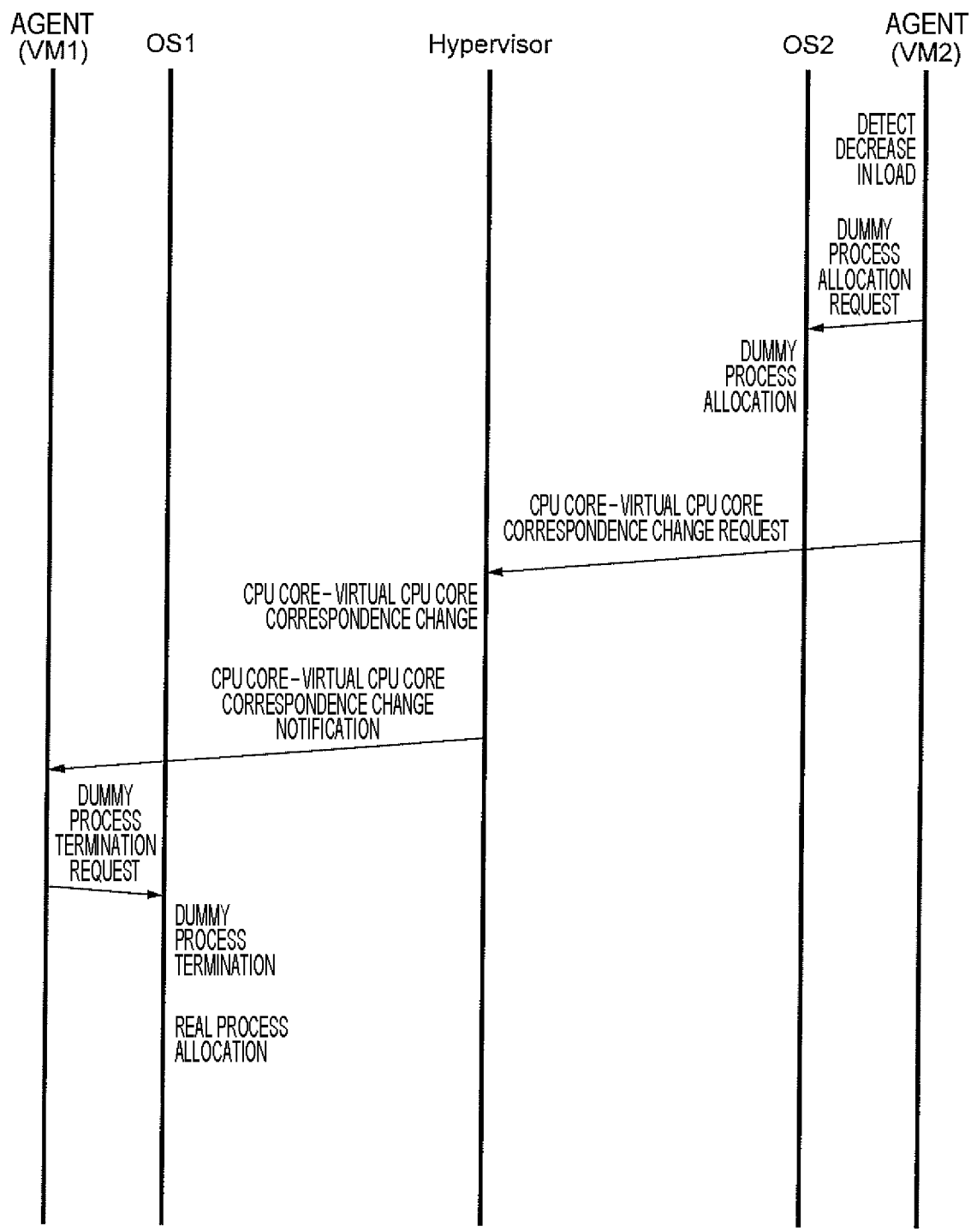
FIG. 12 is a sequence chart illustrating operations of the agents 133 and 143, the OSs 131 and 141, and the hypervisor 12 in the first embodiment.

As described above, since the CPU 10 executes the agents 133 and 143 and the hypervisor 12, the contents of each of the tables in FIGS. 3 to 5 are rewritten to the contents in FIGS. 9 to 11, and the configuration illustrated in FIG. 8 is obtained. FIG. 12 is a sequence chart illustrating operations of the agents 133 and 143, the OSs 131 and 141, and the hypervisor 12 in the first embodiment. This corresponds to YES in Step S101, YES in S102, S105, and S211, YES in S212, S213, and S111, and S115 from the upper right to the lower left.

According to the ECU (control device) 1 in the present embodiment, with Step S212, it is possible to change the allocation rate of the CPU core (CPU core 1) 1011 to the virtual CPU core (virtual CPU core 2) 1232 in which the virtual machine 14 (VM2) having a low load is operating, to 0%. It is possible to change the allocation rate of the CPU core (CPU core 1) 1011 to the virtual CPU core (virtual CPU core 1) 1231 in which the virtual machine 13 (VM1) is operating, to 100%. It is possible to change the allocation rate of the CPU core in accordance with the load of the virtual machine.

Further, the dummy process 144 is allocated to the virtual CPU core (virtual CPU core 2) 1232 having the allocation rate that is set to 0%, in Step S102 prior to Step S212. Thus, it is possible to prevent an occurrence of a situation in which the OS 141 allocates the real process 145*a* to the virtual CPU core (virtual CPU core 2) 1232. Thus, the ECU 1 including the hypervisor 12 can achieve both the tracking of the load change between the OSs 131 and 141 and the securing of the real-time performance.

Second Embodiment

Next, a second embodiment of the present invention will be described.

Figure 13:
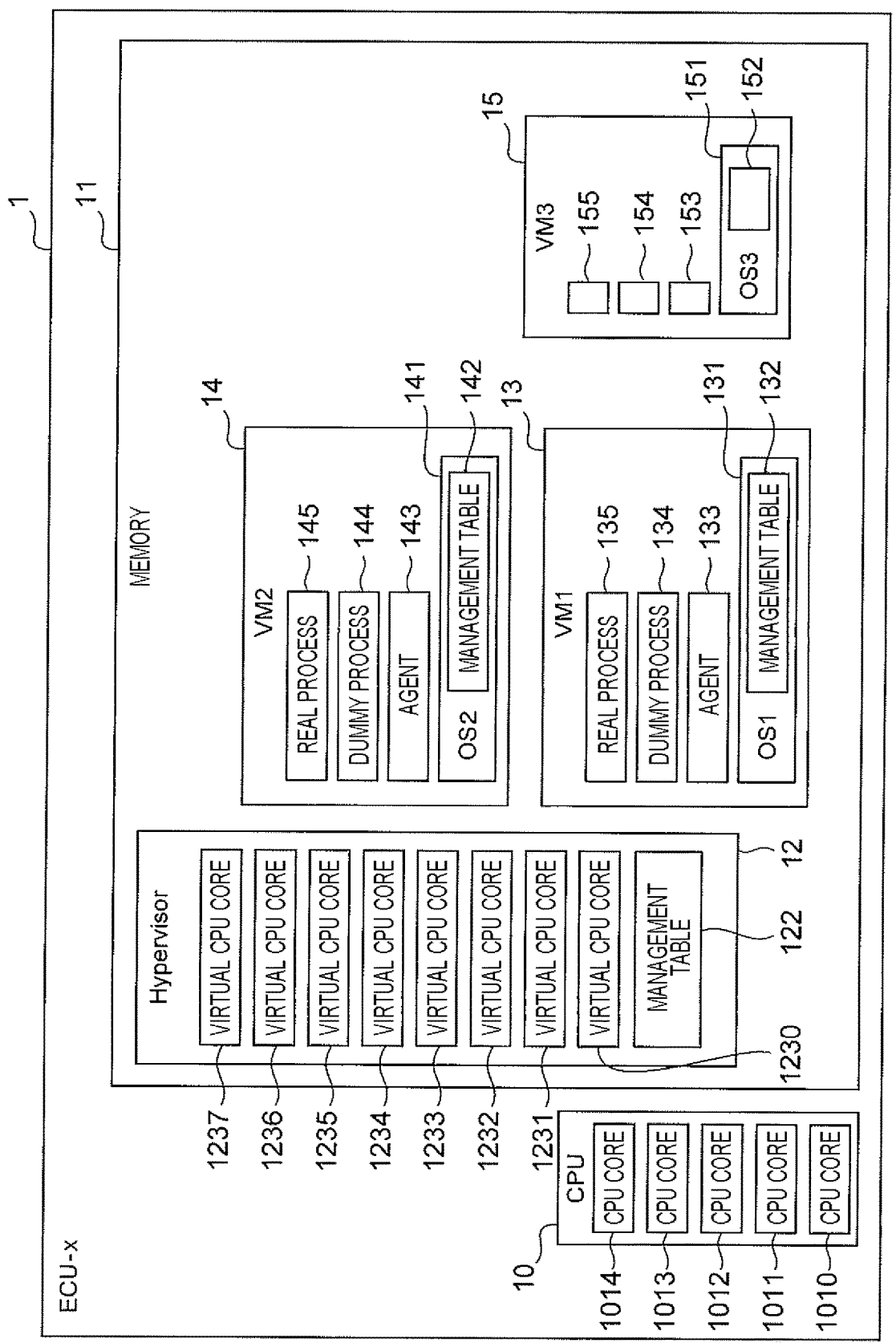
FIG. 13 is a diagram illustrating an overall configuration of a second embodiment.

FIG. 13 is a diagram illustrating an overall configuration of the second embodiment. Configurations similar to those in the first embodiment are denoted by the same reference signs, and detailed descriptions thereof will be omitted.

Differences between the configuration illustrated in FIG. 1 in the first embodiment and the configuration illustrated in FIG. 13 in the second embodiment are the number of CPU cores 1010 to 1014 in the CPU 10, the number of virtual CPU cores 1230 to 1237 in the hypervisor 12, and addition of a virtual machine (VM3) 15. In the present embodiment, a case where the number of CPU cores in the CPU 10 is 5, the number of virtual CPU cores in the hypervisor 12 is 8, and the number of virtual machines is 3 will be described.

The virtual machine (VM3) 15 has a configuration similar to the configurations of the virtual machines (VM1 and VM2) 13 and 14, and includes programs of an OS (OS3) 151, an agent 153, a dummy process 154, and a real process 155. The OS (OS3) 151 includes a management table 152.

Figure 14:
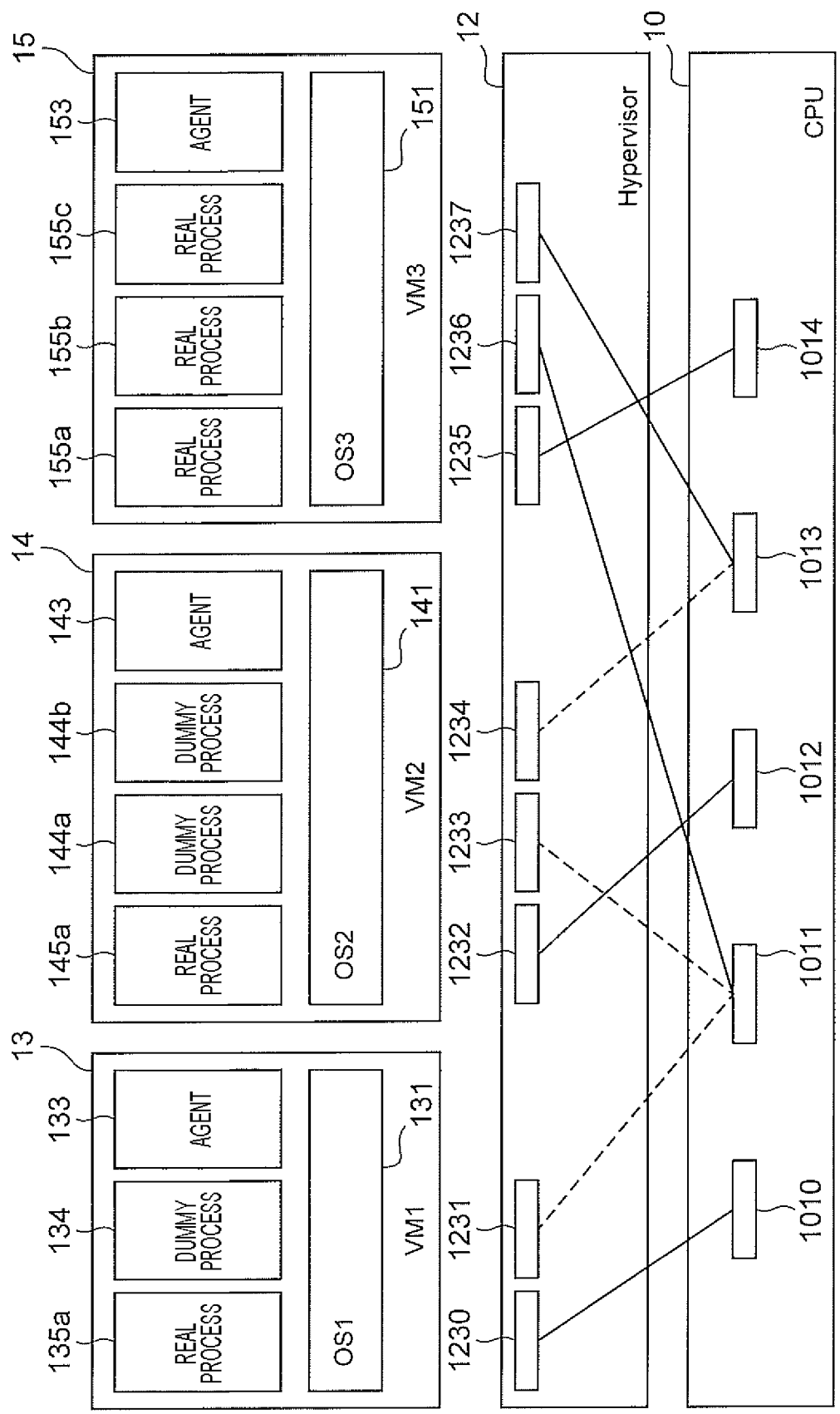
FIG. 14 is a diagram illustrating a functional configuration in the second embodiment.

FIG. 14 is a diagram illustrating a functional configuration of a control device in the second embodiment. FIG. 14 illustrates a state in which the virtual machines (VM1 and VM2) 13 and 14 have a low load and the virtual machines (VM1 and VM2) 13 and 14 do not substantially use the CPU cores 1011 and 1013.

FIG. 14 illustrates a state in which the real process 135*a* and the dummy process 134 are executed in the virtual machine (VM1) 13, the real process 145*a* and the dummy processes 144*a* and 144*b* are executed in the virtual machine (VM2) 14, and real processes 155*a* to 155*c* are executed in the virtual machine (VM3) 15.

The hypervisor 12 virtualizes the program in the virtual machine (VM1) 13 as if the virtual CPU cores (virtual CPU Cores 0 and 1) 1230 and 1231 execute the program, and virtualizes the program in the virtual machine (VM2) 14 as if the virtual CPU cores (virtual CPU cores 2 to 4) 1232 to 1234 execute the program. The hypervisor virtualizes the program in the virtual machine (VM3) 15 as if the virtual CPU cores 1235 to 1237 (virtual CPU cores 5 to 7) execute the program.

The CPU core (CPU core 0) 1010 is associated with the virtual CPU core (virtual CPU core 0) 1230. The CPU core (CPU core 2) 1012 is associated with the virtual CPU core (virtual CPU core 2) 1232. The CPU core (CPU core 4) 1014 is associated with the virtual CPU core (virtual CPU core 5) 1235. The CPU core (CPU core 1) 1011 is associated with the three virtual CPU cores (virtual CPU cores 1, 3, and 6) 1231, 1233, and 1236. The CPU core (CPU core 3) 1013 is associated with the two virtual CPU cores (virtual CPU cores 4 and 7) 1234 and 1237.

The virtual machine (VM1) 13 shares one virtual CPU core (virtual CPU core 1) 1231 with another virtual machine (VM2) 14. The virtual machine (VM2) 14 shares the two virtual CPU cores (virtual CPU cores 3 and 4) 1233 and 1234 with other virtual machines (VM1 and VM3) 13 and 15. The virtual machine (VM3) 15 shares the two virtual CPU cores (virtual CPU cores 6 and 7) 1236 and 1237 with the other virtual machines (VM1 and VM2) 13 and 14.

FIGS. 15 to 18 are configuration diagrams illustrating management tables of the hypervisor 12 and the OS (OS1 to OS3) 131 to 133 corresponding to the state illustrated in FIG. 14. FIG. 15 is a configuration diagram of a management table 122 in the hypervisor 12 in the second embodiment, and is a diagram corresponding to FIG. 3 in the first embodiment.

A CPU core-virtual CPU core correspondence table 1221 in FIG. 15 shows the correspondence between the CPU cores (CPU core 0 to 4) 1011 to 1014 and the virtual CPU cores (virtual CPU core 0 to 7) 1230 to 1237. For example, the CPU core (CPU core 1) 1011 is associated with the virtual CPU cores (virtual CPU cores 1, 3, and 6) 1231, 1233, and 1236. The two virtual CPU cores (virtual CPU cores 1 and 3) 1231 and 1233 have an allocation rate of 0%. The allocation rate of the virtual CPU core (virtual CPU core 6) 1236 that shares the CPU core (CPU core 1) 1011 with the virtual CPU cores (virtual CPU cores 1 and 3) 1231 and 1233 is 100%.

Figure 16:
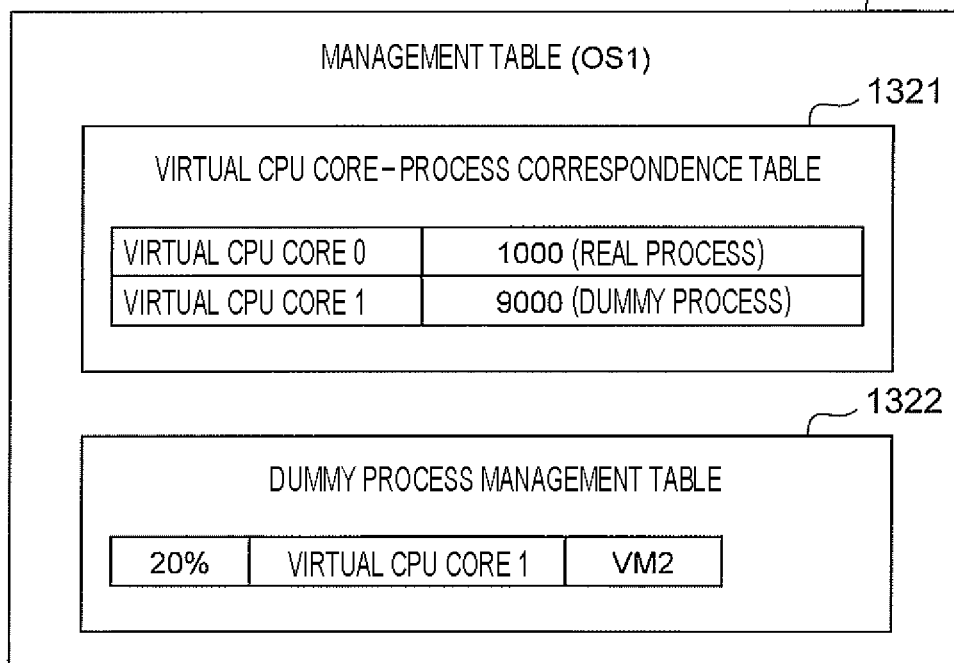
FIG. 16 is a configuration diagram illustrating a management table 132 in an OS 131 in the second embodiment.

A virtual CPU core-VM correspondence table 1222 in FIG. 15 shows that the virtual CPU cores (virtual CPU cores 0 and 1) 1230 and 1231 are associated with the virtual machine (VM1) 13, the virtual CPU cores (virtual CPU core 2 to 4) 1232 to 1234 are associated with the virtual machine (VM2) 14, and the virtual CPU cores (virtual CPU core 5 to 7) 1235 to 1237 are associated with the virtual machine (VM3) 15. FIG. 16 is a configuration diagram of a management table 132 in the OS 131 in the second embodiment, and is a diagram corresponding to FIG. 4 in the first embodiment. The configuration of the management table 132 illustrated in FIG. 16 is the same as that in FIG. 4.

Figure 17:
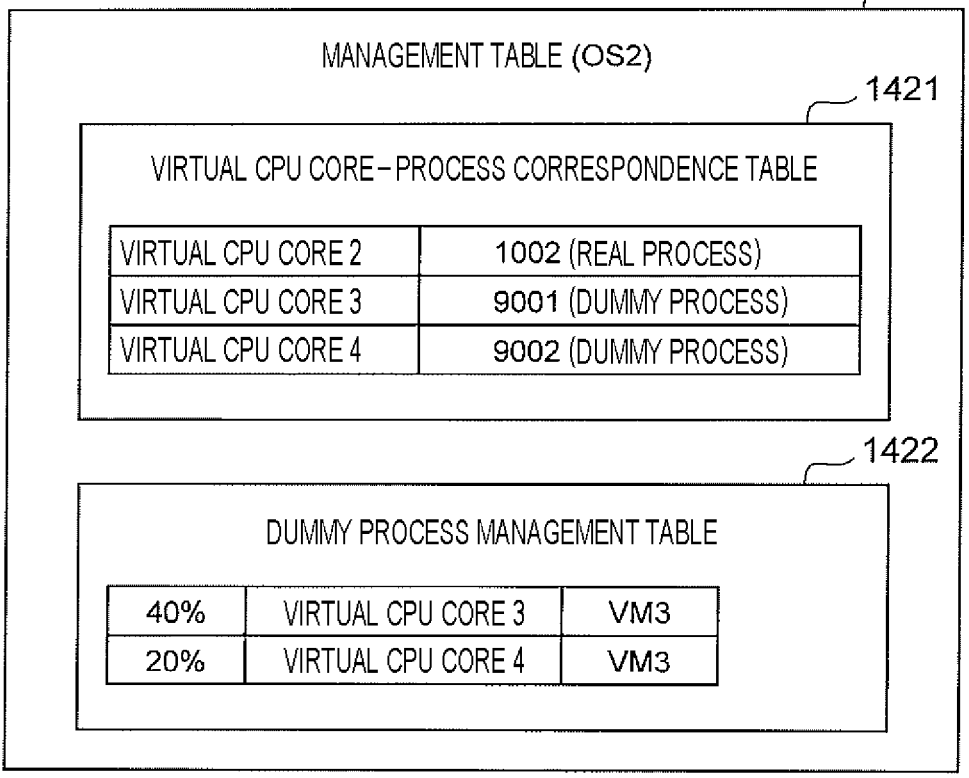
FIG. 17 is a configuration diagram illustrating a management table 142 in an OS 141 in the second embodiment.

FIG. 17 is a configuration diagram illustrating a management table 142 in the OS 141 in the second embodiment. The example illustrated in FIG. 17 illustrates that a process 1002 (real process 145*a*) is executed by the virtual CPU core (virtual CPU core 2) 1232, and a processes 9001 and 9002 (dummy processes 144*a* and 144*b*) are executed by the virtual CPU cores (virtual CPU cores 3 and 4) 1233 and 1234. In the dummy process management table 1422, each of the virtual CPU cores (virtual CPU cores 3 and 4) 1233 and 1234 is associated with the virtual machine (VM3) 15, the threshold value for the virtual CPU core (virtual CPU core 3) 1233 is set to 40%, and the threshold value for the virtual CPU core (virtual CPU core 4) 1234 is set to 20%.

In the dummy process management table 1422, since there are two threshold values, the number of virtual CPU cores of which the correspondence with the CPU cores is changed in accordance with the use rate. In the case of the virtual machine (VM2) 14, the three virtual CPU cores (virtual CPU cores 2 to 4) 1232 to 1234 are associated with the virtual machine (VM2) 14. Thus, the sum of the use rates of the virtual CPU cores in the virtual machine (VM2) 14 has a value up to 300% at the maximum.

The agent 143 of the virtual machine (VM2) 14 compares the sum of the use rates ((sum of the use rates of the two virtual CPU cores (virtual CPU cores 2 to 4) 1232 to 1234) with the threshold values of 20% and 40% defined in the dummy process management table 1422, and determines whether or not the load of the virtual machine (VM2) 14 is low. For example, when the use rate of the OS 141 has a value which is lower than the threshold value of 40% and higher than the threshold value of 20%, the process 9001 (dummy process 144*a*) is executed by the virtual CPU core (virtual CPU core 3) 1233. It is shown that, when the use rate of the OS2 is lower than the threshold value of 20%, the process 9002 (dummy process 144*b*) is further executed by the virtual CPU core (virtual CPU core 4) 1234.

Figure 18:
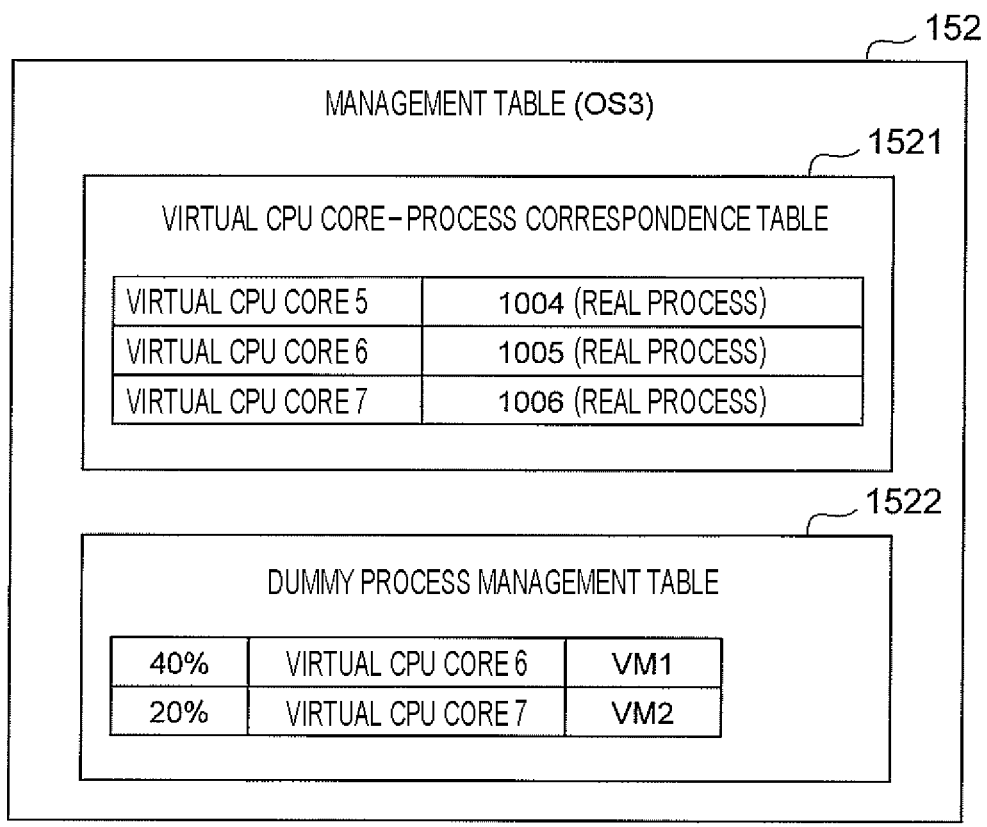
FIG. 18 is a configuration diagram illustrating a management table 152 in an OS 151 in the second embodiment.

FIG. 18 is a configuration diagram illustrating a management table 152 in the OS 151 in the second embodiment. In the example illustrated in FIG. 18, processes 1004 to 1006 (real processes 155*a* to 155*c*) are executed by the virtual CPU core (virtual CPU core 5 to 7) 1235 to 1237. In the dummy process management table 1522, the virtual CPU cores (virtual CPU cores 6 and 7) 1236 and 1237 are associated with the virtual machines (VM1 and VM2) 13 and 14, respectively, the threshold value for the virtual CPU core (virtual CPU core 6) 1236 is set to 40%, and the threshold value for the virtual CPU core (virtual CPU core 7) 1237 is set to 20%. The dummy process management table 1522 shows, for example, that, when the use rate of the OS 151 has a value which is lower than the threshold value of 40% and higher than the threshold value of 20%, the process 1004 (real process 155*b*) is executed by the virtual CPU core (virtual CPU core 6) 1236, and when the use rate of the OS 3 is lower than the threshold value of 20%, the process 1006 (real process 155*c*) is further executed by the virtual CPU core (virtual CPU core 7) 1237.

Figure 19:
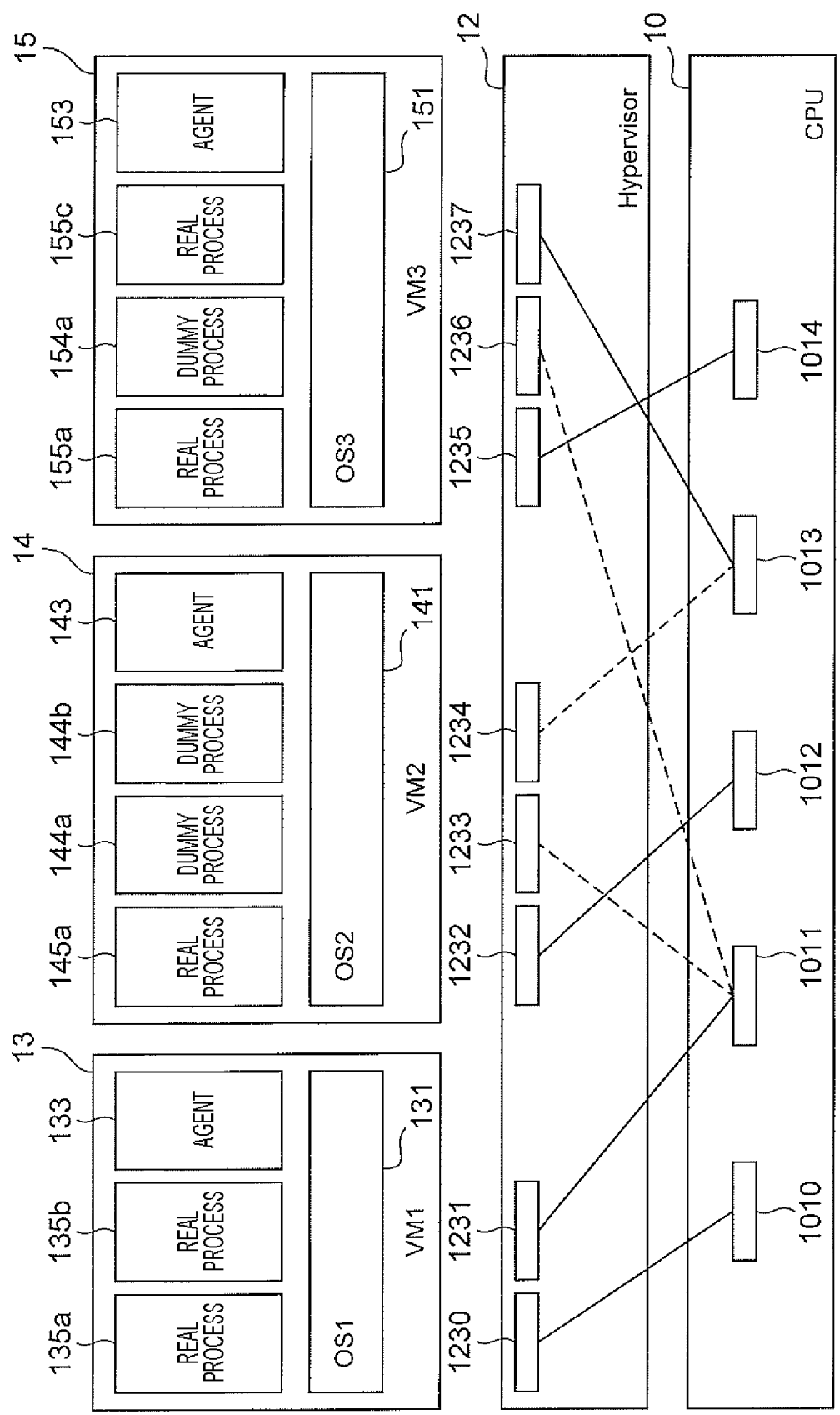
FIG. 19 is a diagram illustrating the functional configuration in the second embodiment.

FIG. 19 is a diagram illustrating a functional configuration in the second embodiment. FIG. 19 illustrates a state in which the virtual machines (VM2 and VN3) 14 and 15 have a low load, the virtual machine (VM2) 14 does not substantially use the CPU cores 1011 and 1013, and the virtual machine (VM3) 15 does not substantially use the CPU core 1011. That is, FIG. 19 illustrates a state in which the real processes 135*a* and 135*b* are executed in the virtual machine (VM1) 13, the real process 145*a* and the dummy processes 144*a* and 144*b* are executed in the virtual machine (VM2) 14, and the real processes 155*a* and 155*c* and the dummy process 154*b* are executed in the virtual machine 15 (VM3).

The hypervisor 12 virtualizes the program in the virtual machine (VM2) 14 as if the virtual CPU cores (CPU core 2 to 4) 1232 to 1234 execute the program, and virtualizes the program in the virtual machine (VM3) 15 as if the virtual CPU cores (virtual CPU core 5 to 7) 1235 to 1237 executes the program. Then, the program in the virtual machine (VM1) 13 is virtualized as if the virtual CPU cores (virtual CPU cores 0 and 1) 1231 and 1232 execute the program. According to the control device in the present embodiment, it is possible to change the association between the virtual CPU core and the CPU core, from one virtual machine to two or more virtual machines.

FIGS. 20 to 23 are configuration diagrams illustrating the management tables of the hypervisor 12 and the OS (OS1 to OS3) 131 to 133 corresponding to the state illustrated in FIG. 19.

FIG. 20 is a configuration diagram illustrating the management table 122 in the hypervisor 12 in the second embodiment. According to FIG. 20, the allocation rate of 0% is set for the three virtual CPU cores (virtual CPU cores 3, 4, and 6) 1233, 1234, and 1236. Differences from the example illustrated in FIG. 15 are that the allocation rate of the virtual CPU core (virtual CPU core 6) 1236 is 0%, and the allocation rate of the virtual CPU core (virtual CPU core 1) 1231 is 100%.

Figure 21:
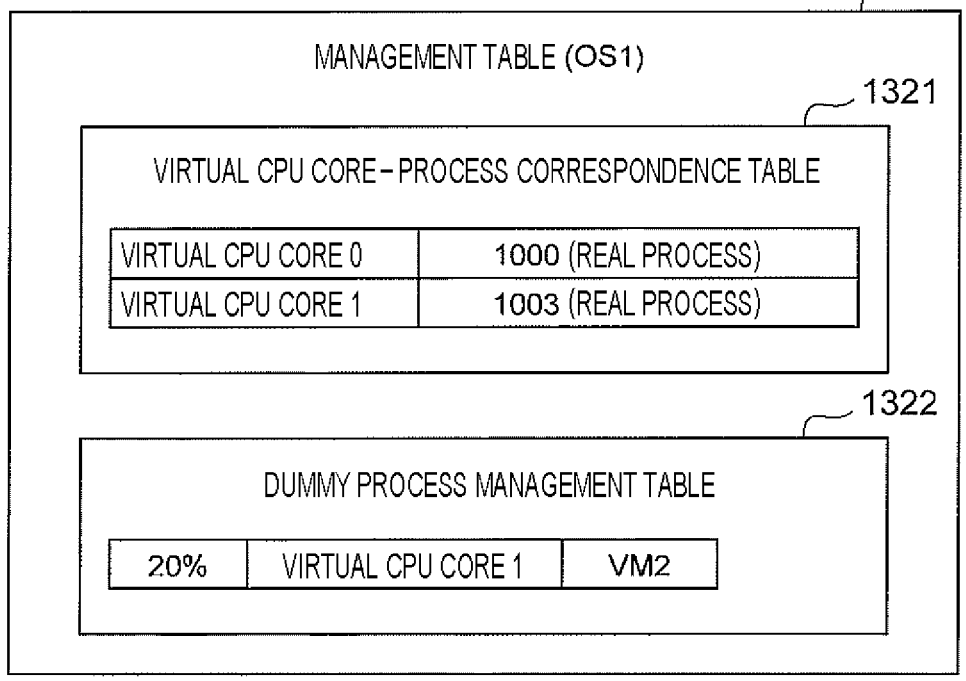
FIG. 21 is a configuration diagram illustrating the management table 132 in the OS 131 in the second embodiment.

FIG. 21 is a configuration diagram illustrating the management table 132 in the OS 131 in the second embodiment. A difference from the example illustrated in FIG. 16 is that the real process 1003 (real process 135*b*) is allocated to the virtual CPU core (virtual CPU core 1) 1231.

Figure 22:
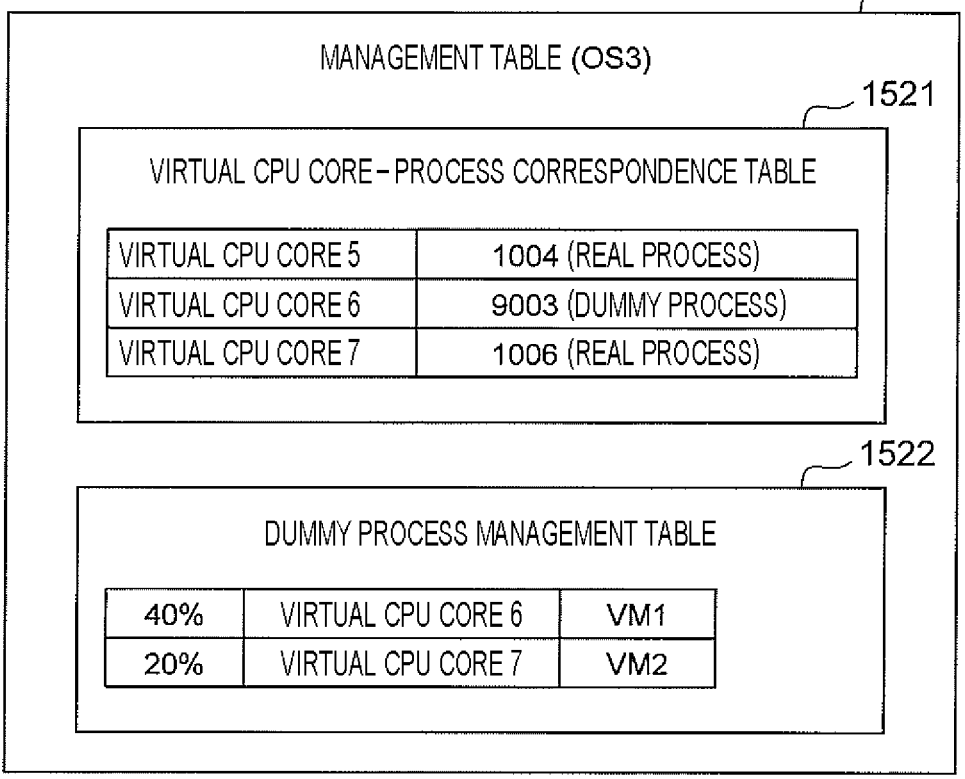
FIG. 22 is a configuration diagram illustrating the management table 152 in the OS 151 in the second embodiment.

FIG. 22 is a configuration diagram illustrating the management table 152 in the OS 151 in the second embodiment. A difference from the configuration illustrated in FIG. 18 is that a dummy process 9003 (dummy process 154*a*) is allocated to the virtual CPU core (virtual CPU core 6) 1236.

Figure 23:
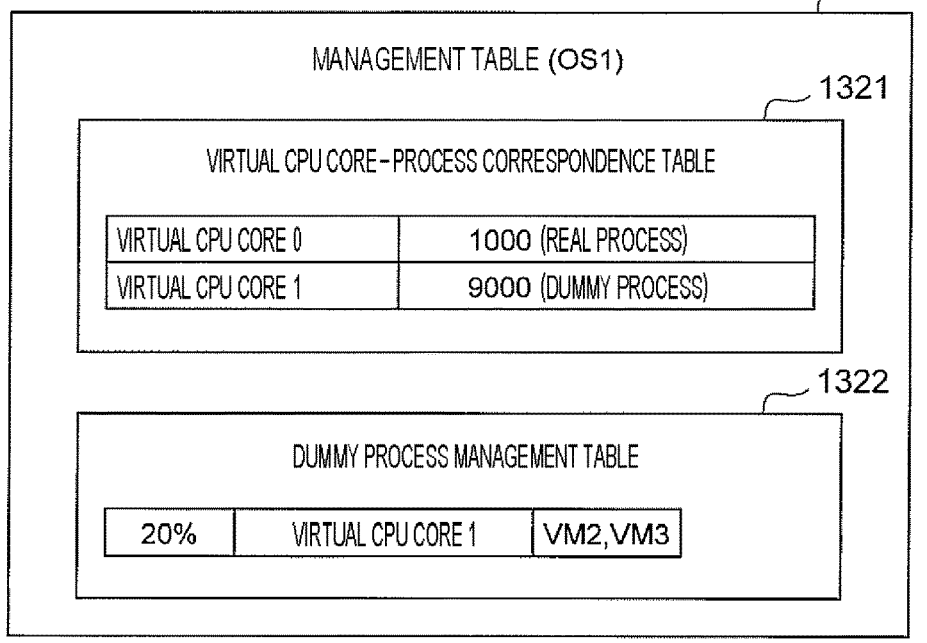
FIG. 23 is a configuration diagram illustrating a management table 132 included in an OS 131 according to a modification example of the second embodiment.

FIG. 23 illustrates a modification example of the second embodiment, and is a configuration diagram illustrating the management table 132 in the OS 131. In this modification example, the management table 132 has a configuration in which a plurality of notification destinations of the virtual machine is provided in the dummy process management table 1322 (VM2 and VM3), and the notification destination can be changed in accordance with the load.

Third Embodiment

Next, a third embodiment of the present invention will be described with reference to FIGS. 24 to 29.

Figure 24:
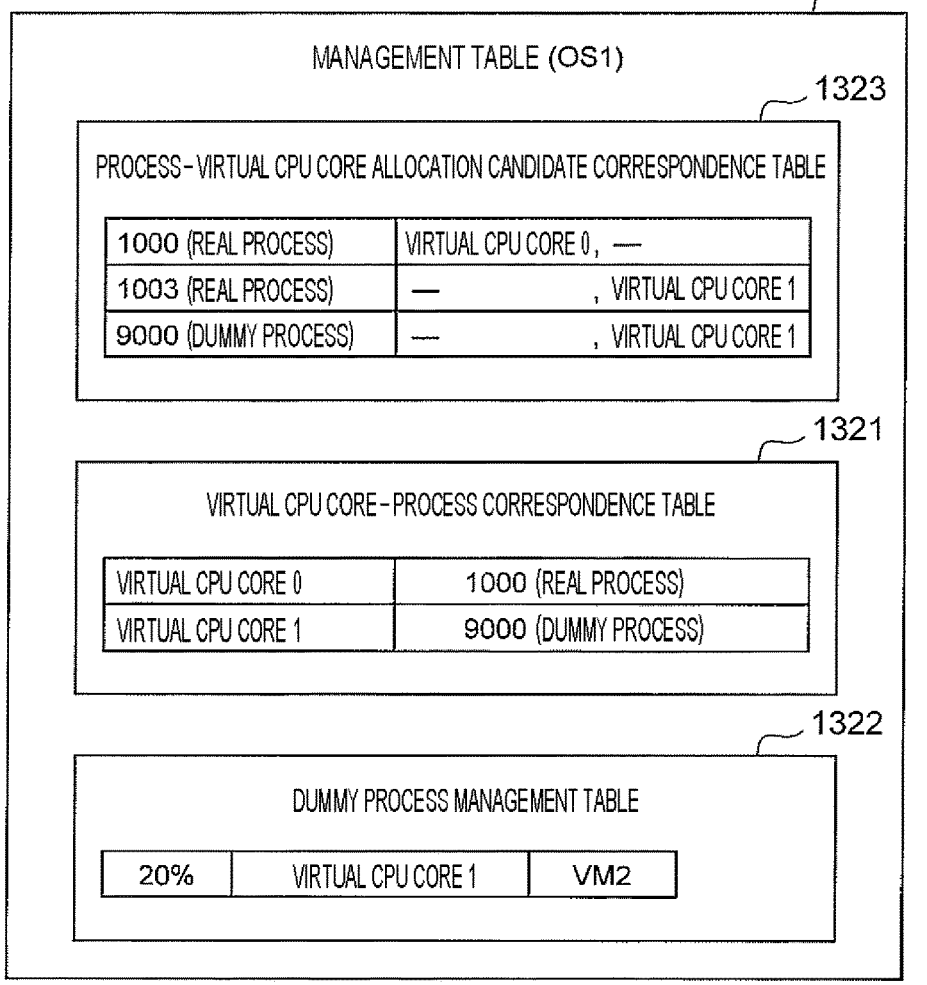
FIG. 24 is a configuration diagram illustrating a management table 132 in an OS 131 according to a third embodiment.
Figure 26:
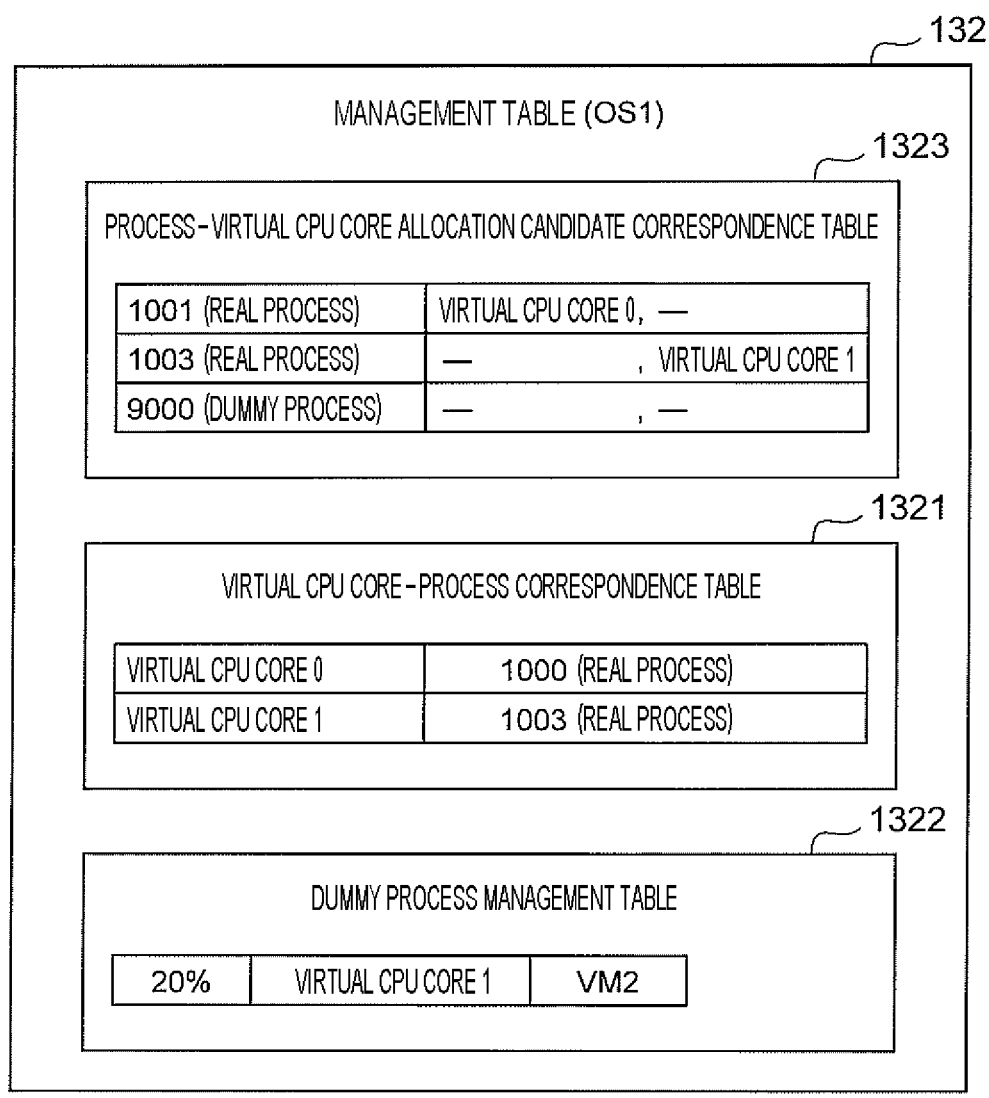
FIG. 26 is a configuration diagram illustrating the management table 132 in the OS 131 in the third embodiment.

FIGS. 24 and 26 are configuration diagrams of a management table 132 in the OS 131 in the third embodiment. The configuration illustrated in FIG. 24 corresponds to FIG. 4, and the configuration illustrated in FIG. 26 corresponds to FIG. 10. Configurations similar to those in the above-described embodiments are denoted by the same reference signs, and detailed descriptions thereof will be omitted.

In the present embodiment, the management table 132 of the OS (OS1) 131 includes a process-virtual CPU core allocation candidate correspondence table 1323 in addition to the configuration illustrated in FIG. 4. The process-virtual CPU core allocation candidate correspondence table 1323 designates a virtual CPU core that can respectively operate the real process and the dummy process.

For example, in the process-virtual CPU core allocation candidate correspondence table 1323 illustrated in FIG. 24, the virtual CPU core (virtual CPU core 1) 1231 is designated as a virtual CPU core that can respectively operate the process 9000 (dummy process 134) and the process 1003 (real process 135). In the dummy process and the real process, since the dummy process has a higher priority than the real process, the virtual CPU core (virtual CPU core 1) 1231 executes the dummy process 134.

Figure 25:
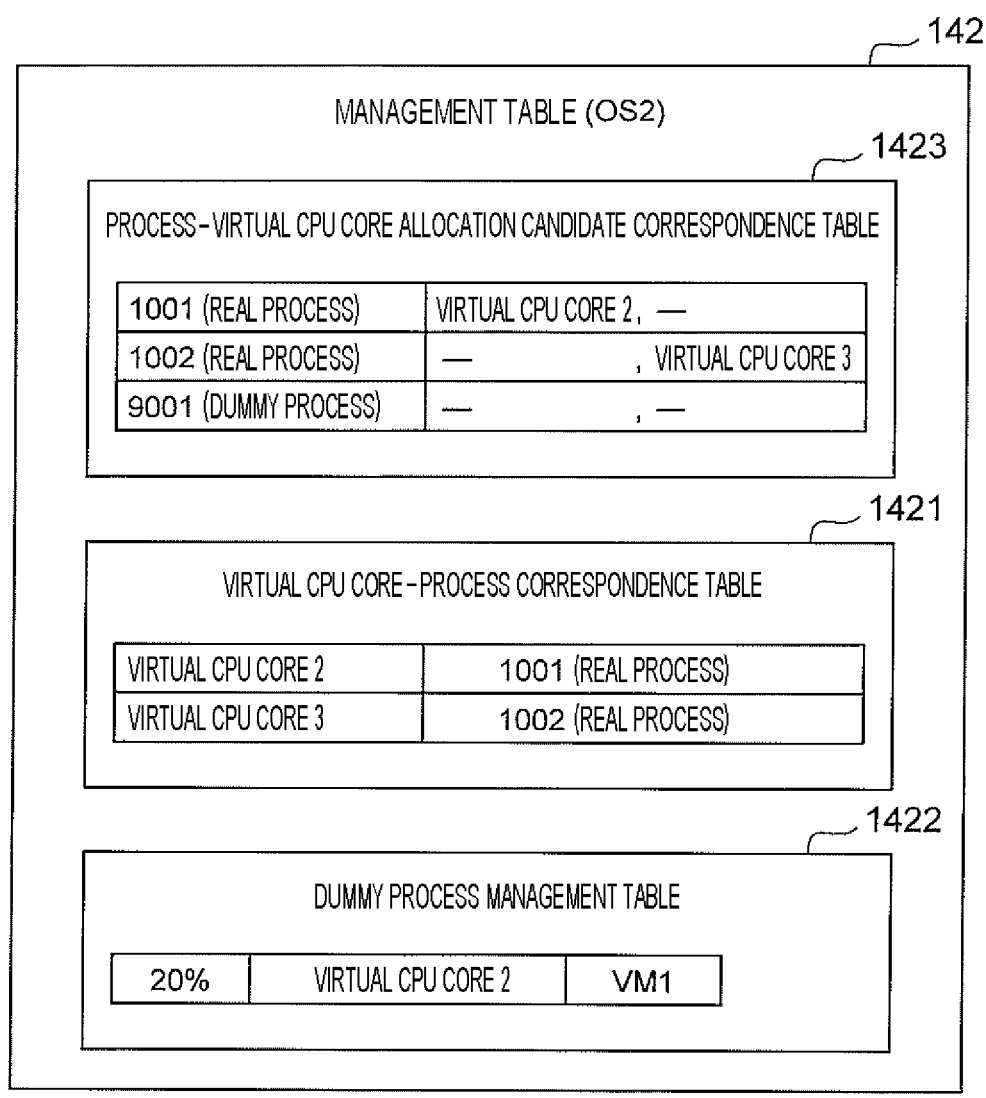
FIG. 25 is a configuration diagram illustrating a management table 142 in an OS 141 in the third embodiment.
Figure 27:
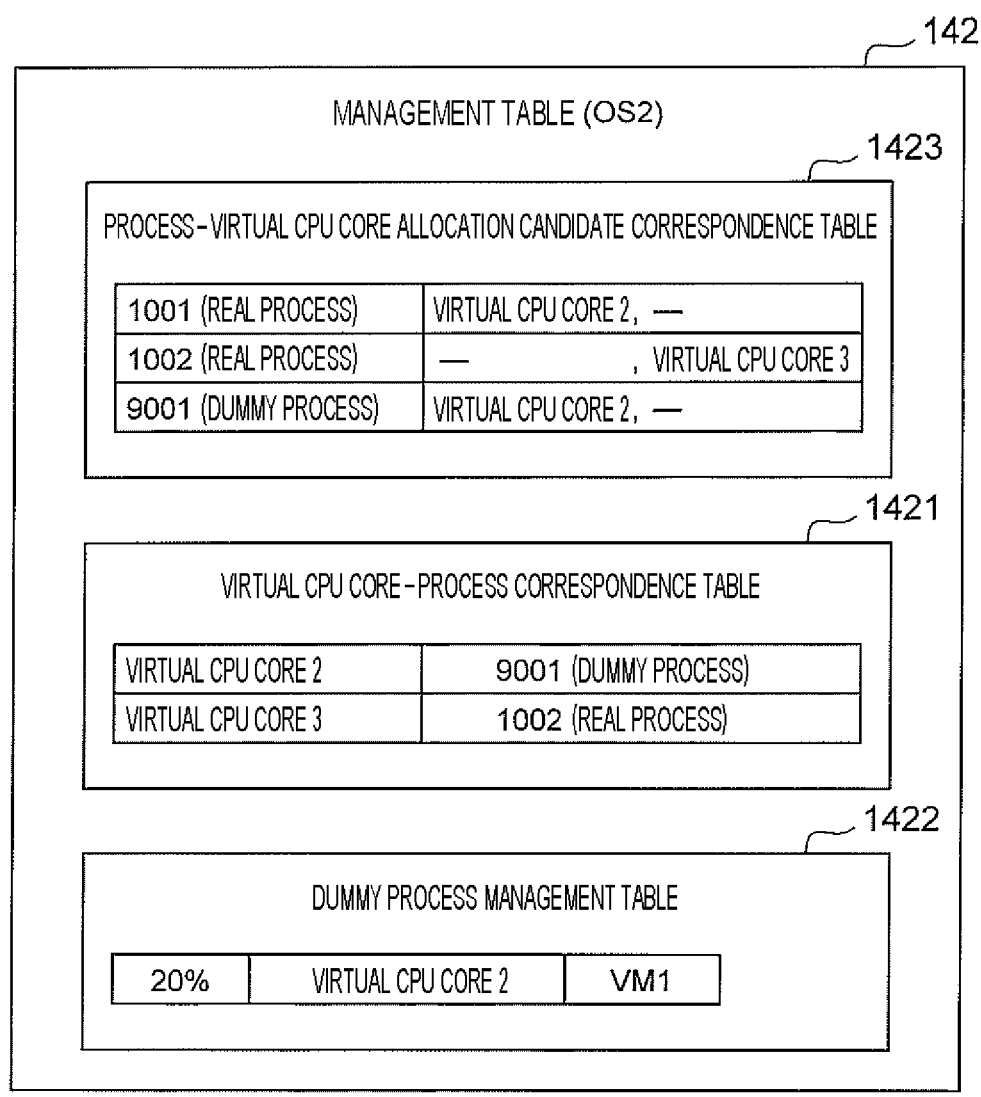
FIG. 27 is a configuration diagram illustrating the management table 142 in the OS 141 in the third embodiment.

FIGS. 25 and 27 are configuration diagrams illustrating a management table 142 in the OS 141. The configuration illustrated in FIG. 25 corresponds to FIG. 5, and the configuration illustrated in FIG. 27 corresponds to FIG. 11.

In the present embodiment, the management table 142 of the OS (OS2) 141 includes a process-virtual CPU core allocation candidate correspondence table 1423 in addition to the configuration illustrated in FIG. 5. The configuration of the process-virtual CPU core allocation candidate correspondence table 1423 is the same as that of the process-virtual CPU core allocation candidate correspondence table 1323 illustrated in FIG. 24. In FIG. 25, since the virtual CPU core is not associated with the dummy process, the dummy process does not operate.

Figure 28:
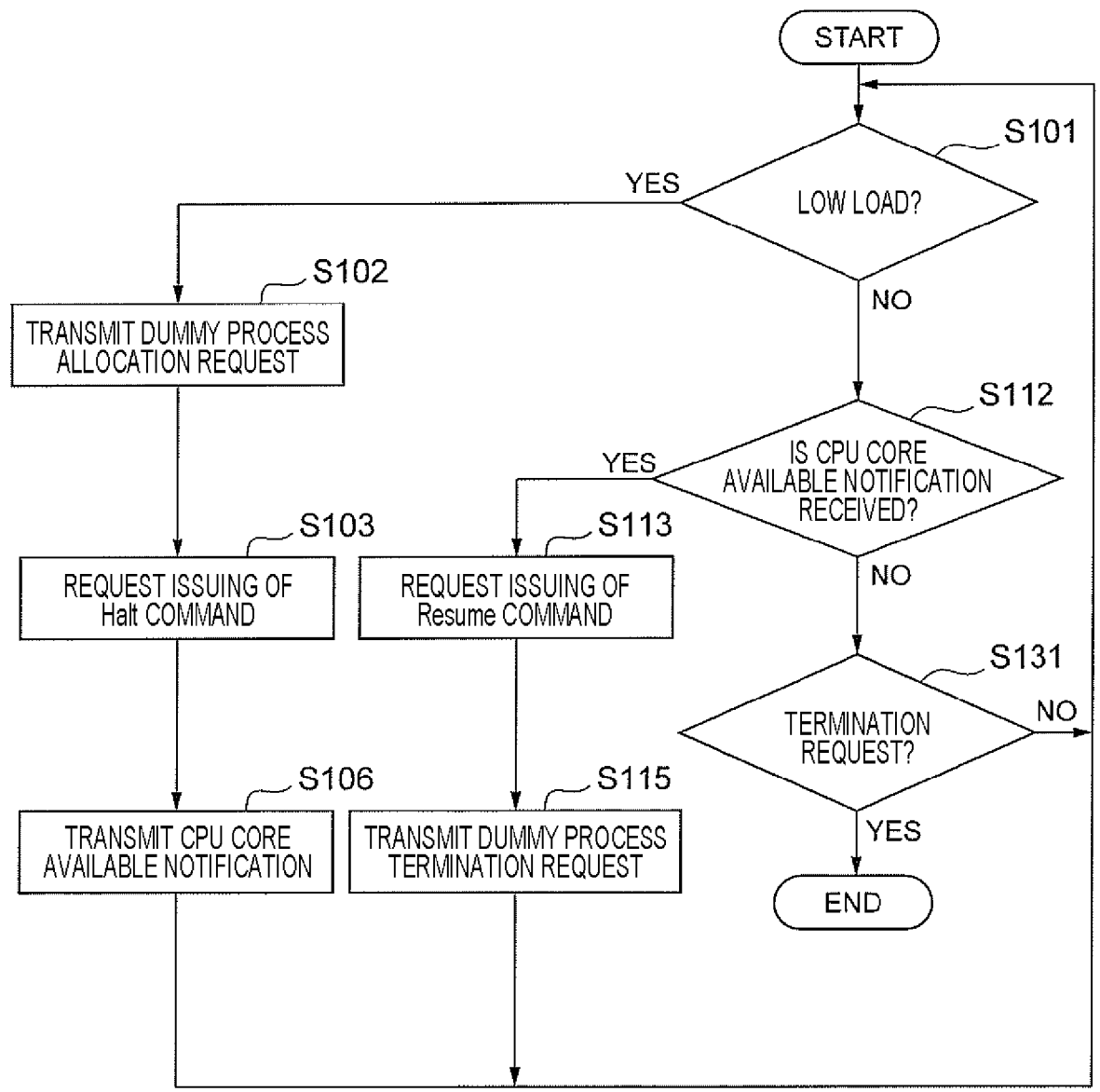
FIG. 28 is a flowchart illustrating processing contents of agents 133 and 143 in the third embodiment.

FIG. 28 is a flowchart illustrating processing contents of the agents 133 and 143 in the third embodiment. Differences from the configuration in the first embodiment illustrated in FIG. 6 are that Steps S103 and S106 are executed instead of Step S105 in FIG. 6, and Step S113 is executed before Step S115.

In Step S103, the OS (OS2) 141 is requested to issue a Halt command to the hypervisor 12. This request is made by designating the virtual CPU core (virtual CPU core 2) 1232, and the virtual CPU core (virtual CPU core 2) 1232 stops the operation. In Step S106, a CPU core available notification is transmitted from the agent 143 on the OS (OS2) 141 to the agent 133 on the OS (OS1) 131.

In Step S112, it is determined whether or not the agent on the OS (OS1) 131 has received the CPU core available notification. When the CPU core available notification has been received (YES in Step S112), in Step S113, the OS (OS1) 131 is requested to issue a Resume command to the hypervisor 12. The request to issue the Resume command is made by designating the virtual CPU core (virtual CPU core 1) 1231 by the agent 133, and the virtual CPU core (virtual CPU core 1) 1231 resumes the operation.

Figure 29:
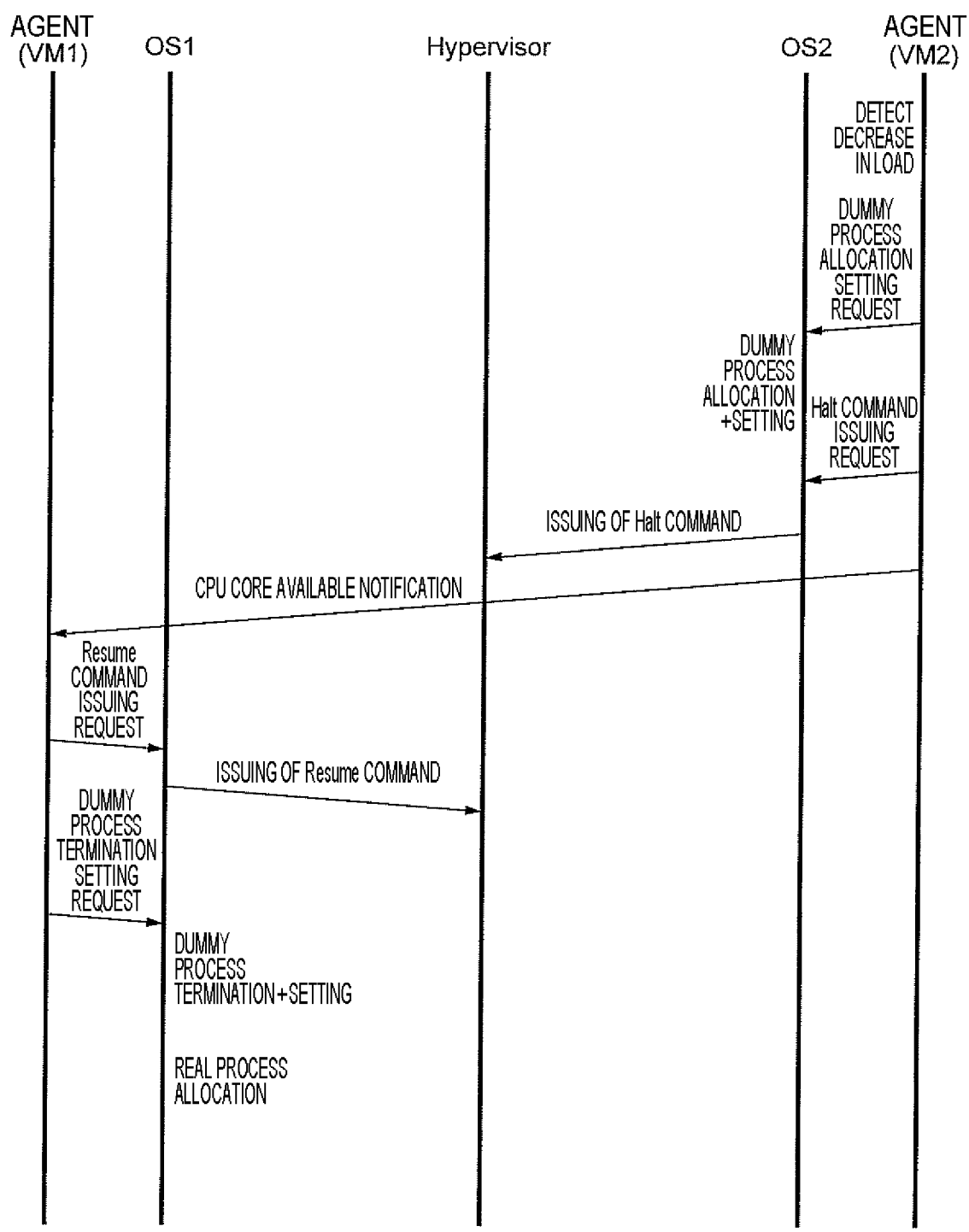
FIG. 29 is a sequence chart illustrating operations of agents 133 and 143, the OSs 131 and 141, and a hypervisor 12 in the third embodiment.

FIG. 29 is a sequence chart illustrating operations of the agents 133 and 143, the OSs (OS1 and OS2) 131 and 141, and the hypervisor 12 in the third embodiment. This corresponds to YES in Step S101, YES in S102, S103, S106, and S112, S113 and S115 from the upper right to the lower left.

In the present embodiment, the hypervisor 12 just receives issuing of a Halt command from the OS (OS1) 131 and issuing of a Resume command from the OS (OS2) 141, and an existing hypervisor that is not modified can be used.

Fourth Embodiment

Next, a fourth embodiment of the present invention will be described.

Figure 30:
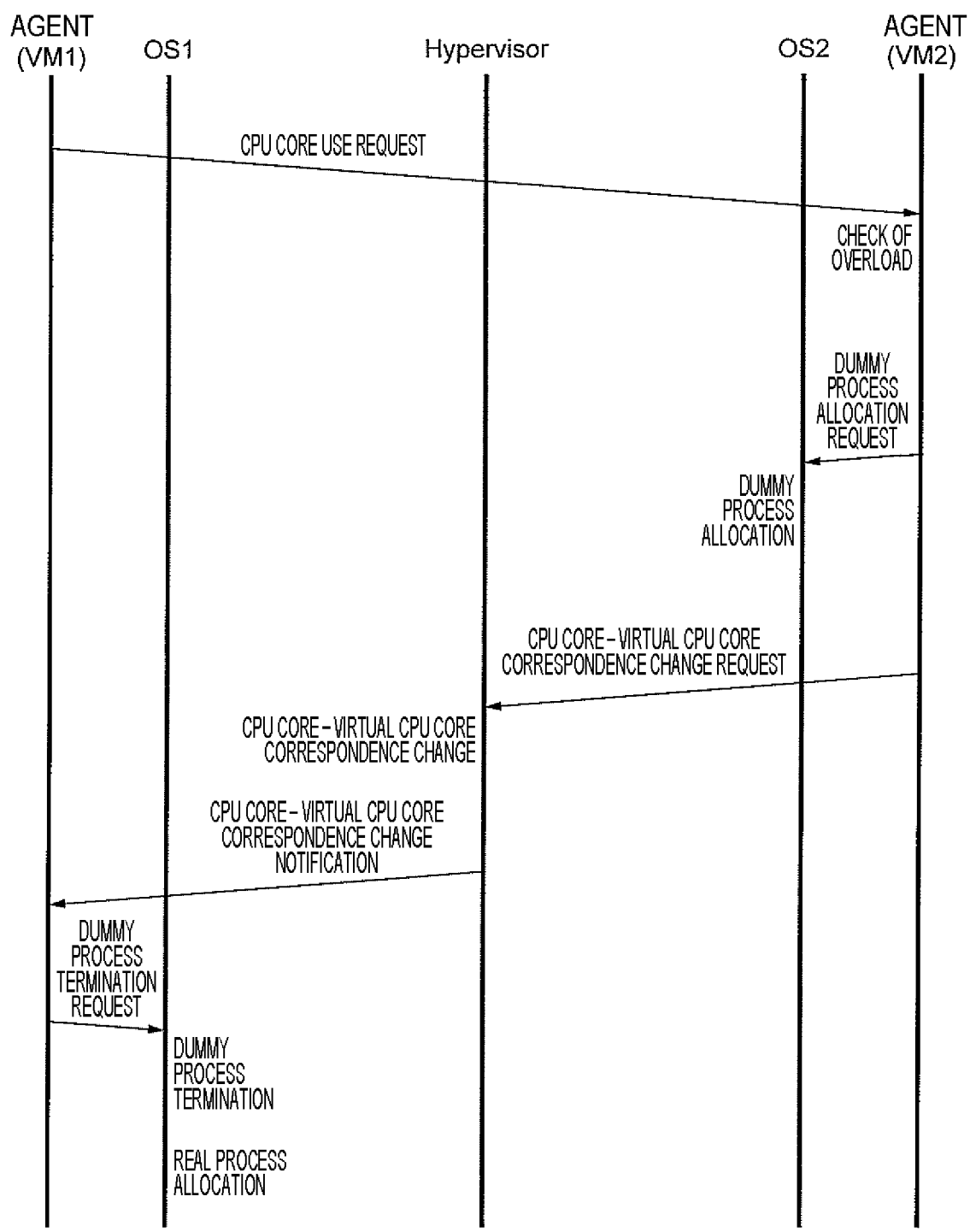
FIG. 30 is a sequence chart illustrating operations of agents 133 and 143, OSs 131 and 141, and a hypervisor 12 in a fourth embodiment.
Figure 31:
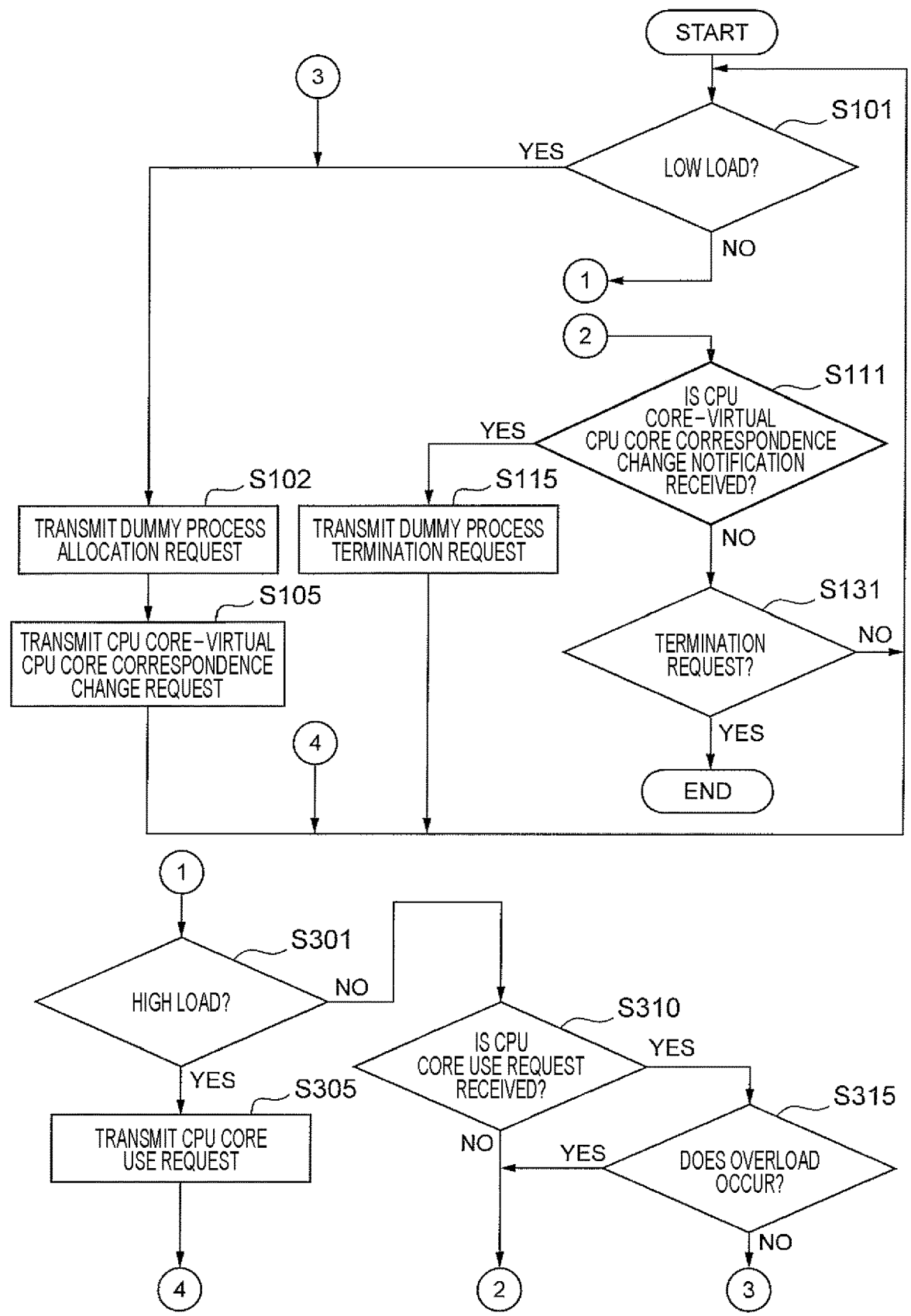
FIG. 31 is a flowchart illustrating processing contents of the agents 133 and 143 in the fourth embodiment.

FIG. 30 is a sequence chart illustrating operations of the agents 133 and 143, the OSs 131 and 141, and the hypervisor 12 in the fourth embodiment. FIG. 31 is a flowchart illustrating processing contents of the agents 133 and 143 in the fourth embodiment. Configurations similar to those in the first embodiment are denoted by the same reference signs, and detailed descriptions thereof will be omitted.

A difference of the present embodiment from the configuration illustrated in FIG. 6 in the first embodiment is that a CPU core use request is issued from a virtual machine with a high load to another virtual machine. For example, the agent 133 of the virtual machine (VM1) 13 determines whether or not the load of the CPU core used by the agent 133 is low (Step S101). When the load is not low (NO in Step S101), the agent 133 determines whether the load is high (Step S301). When the agent 133 determines that the load is high (YES in Step S301), the agent 133 transmits a CPU core use request from the virtual machine (VM1) 13 to the virtual machine (VM2) 14 (Step S305).

When the agent 133 determines that the load is not high (NO in Step S301), the agent 143 of the virtual machine (VM2) 14 determines whether or not the CPU core use request has been received from the virtual machine (VM1) 13 (Step S310). Then, when the CPU core use request is received from the virtual machine (VM1) 13 (YES in Step S310), the agent determines whether the CPU core used by the virtual machine (VM1) 13 is not overload even if the virtual CPU core is handed over to the virtual machine (VM1) 13 (Step S315). Then, in a case where the agent determines that the virtual CPU core is not overload (NO in Step S315), the agent executes the processing in and after Step S102, and hands the virtual CPU core over to the virtual machine (VM1) 13. According to a control device in the present embodiment, it is possible to request the CPU resource from the high-load side among a plurality of virtual machines.

Fifth Embodiment

Next, a fifth embodiment of the present invention will be described. Configurations similar to those in the second embodiment are denoted by the same reference signs, and detailed descriptions thereof will be omitted.

Figure 32:
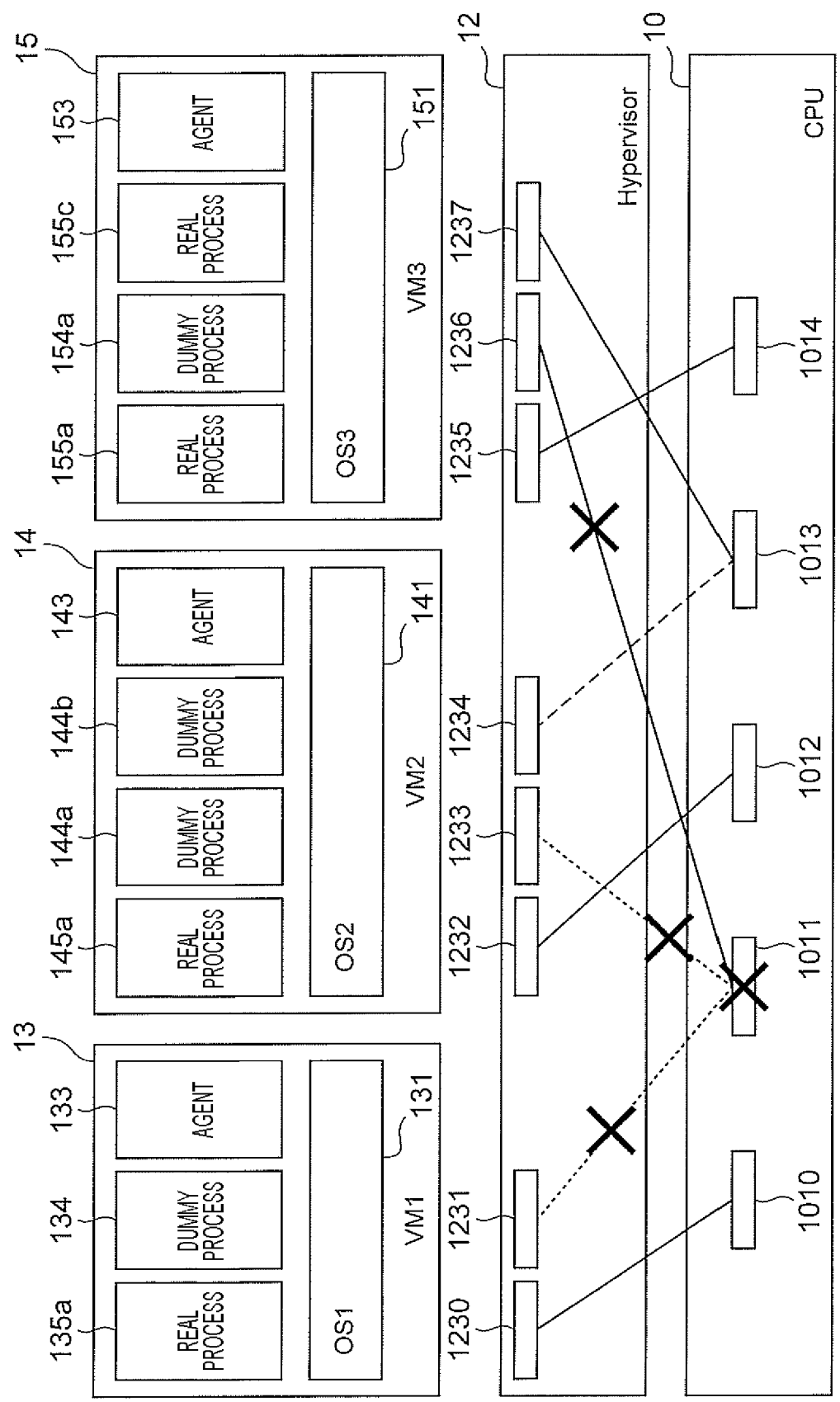
FIG. 32 is a diagram illustrating a functional configuration in a fifth embodiment.

FIG. 32 is a diagram illustrating a functional configuration in the fifth embodiment. A difference of the present embodiment from the second embodiment is that the present embodiment has a configuration assuming that the CPU core 1011 becomes unavailable due to failure or the like.

Figure 33:
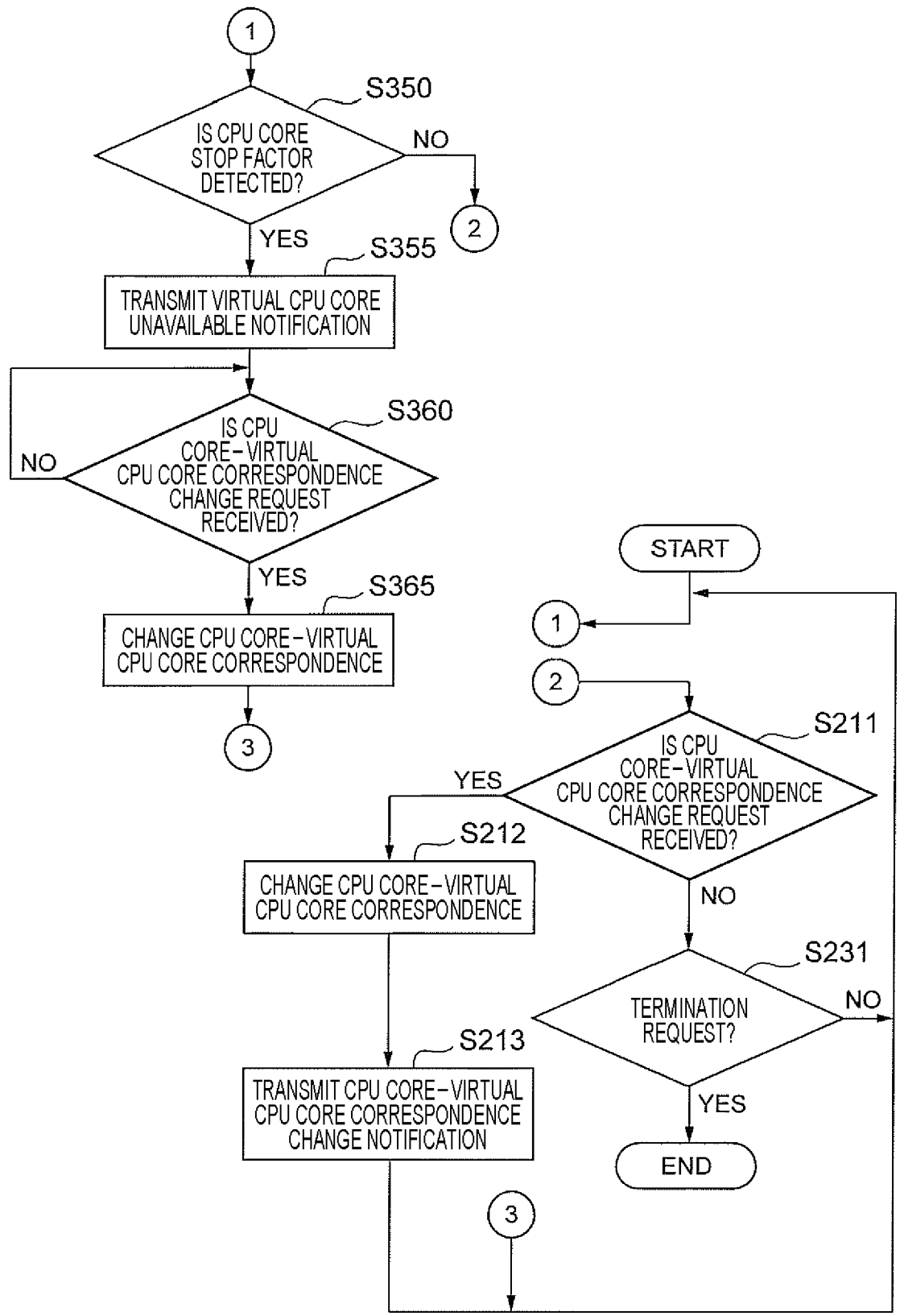
FIG. 33 is a flowchart illustrating processing contents of a hypervisor 12 in the fifth embodiment.

FIG. 33 is a flowchart illustrating processing contents of a hypervisor 12 in the fifth embodiment. The flowchart illustrated in FIG. 33 is different from the configuration illustrated in FIG. 7 in that Steps S350, S355, S360, and S365 are executed before Step S211.

For example, when a stop factor of the CPU core (CPU core 1) 1011 is detected (YES in Step S350), a virtual CPU core unavailable notification is transmitted to the (agent 153 in the configuration in FIG. 32) on the virtual machine that is using the virtual CPU core associated with the CPU core 1011 (Step S355).

Then, the processing waits until a CPU core-virtual CPU core correspondence change request is received (Step S360). When the CPU core-virtual CPU core correspondence change request is received (YES in Step S360), the CPU core-virtual CPU core correspondence is changed (Step S365). The processing content here is the processing content obtained by adding a to the first half of Step S212. That is, the virtual CPU core number simultaneously transmitted is searched from a CPU core-virtual CPU core correspondence table 1221, and the allocation rate of the hit virtual CPU core is changed from 100% to 0%. Further, the CPU core which becomes unavailable is deleted from the CPU core-virtual CPU core correspondence table 1221.

Figure 34:
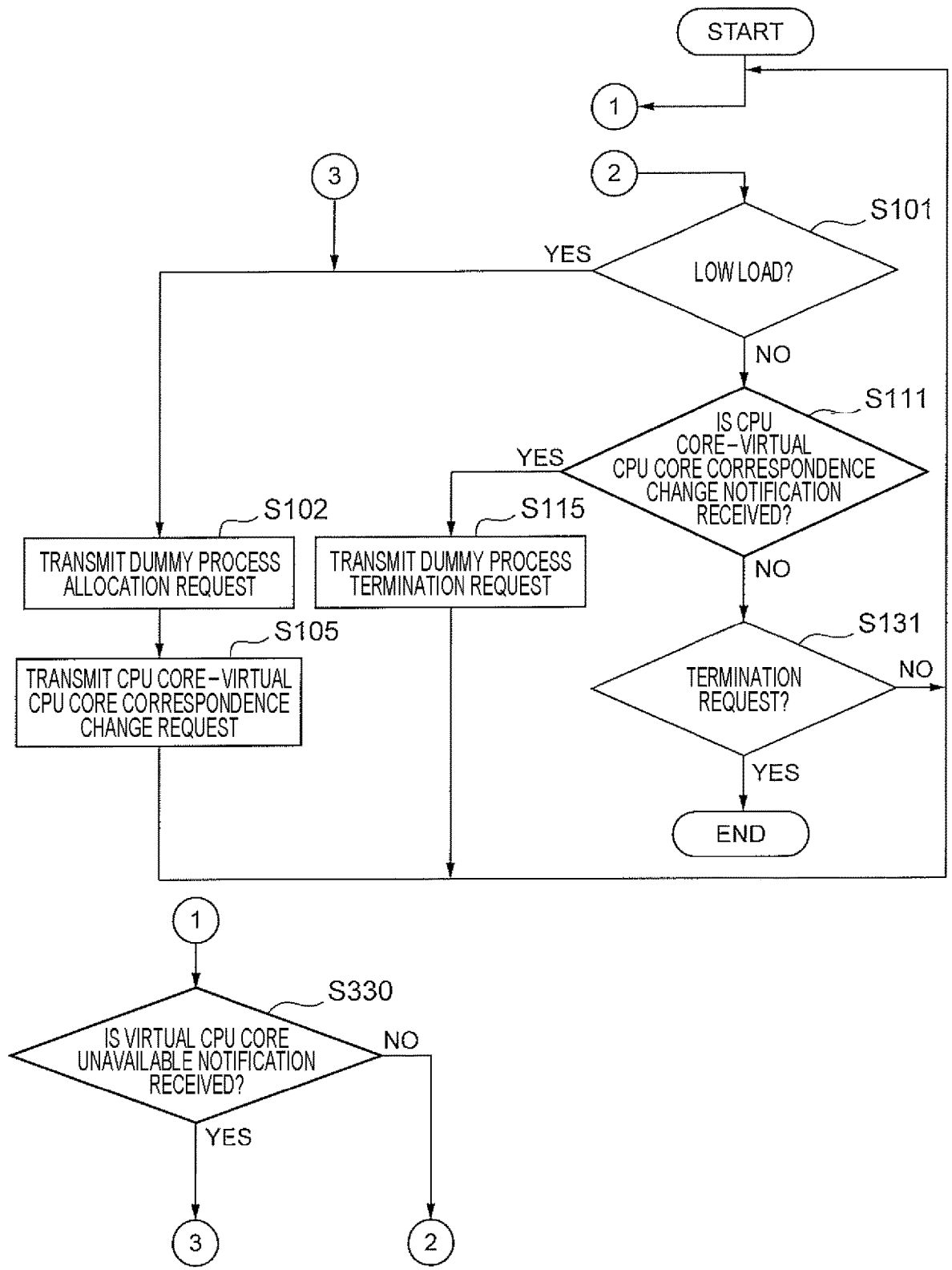
FIG. 34 is a flowchart illustrating processing contents of agents 133 and 143 in the fifth embodiment.

FIG. 34 is a flowchart illustrating processing contents of the agents 133 and 143 in the fifth embodiment. A difference between the configuration illustrated in FIG. 6 and the configuration illustrated in FIG. 34 is that Step S330 is executed before Step S101. In Step S330, it is determined whether the virtual CPU core unavailable notification has been received. When the virtual CPU core unavailability notification has been received, Step S102 and subsequent steps are executed to allocate a dummy process to the virtual CPU.

Figure 35:
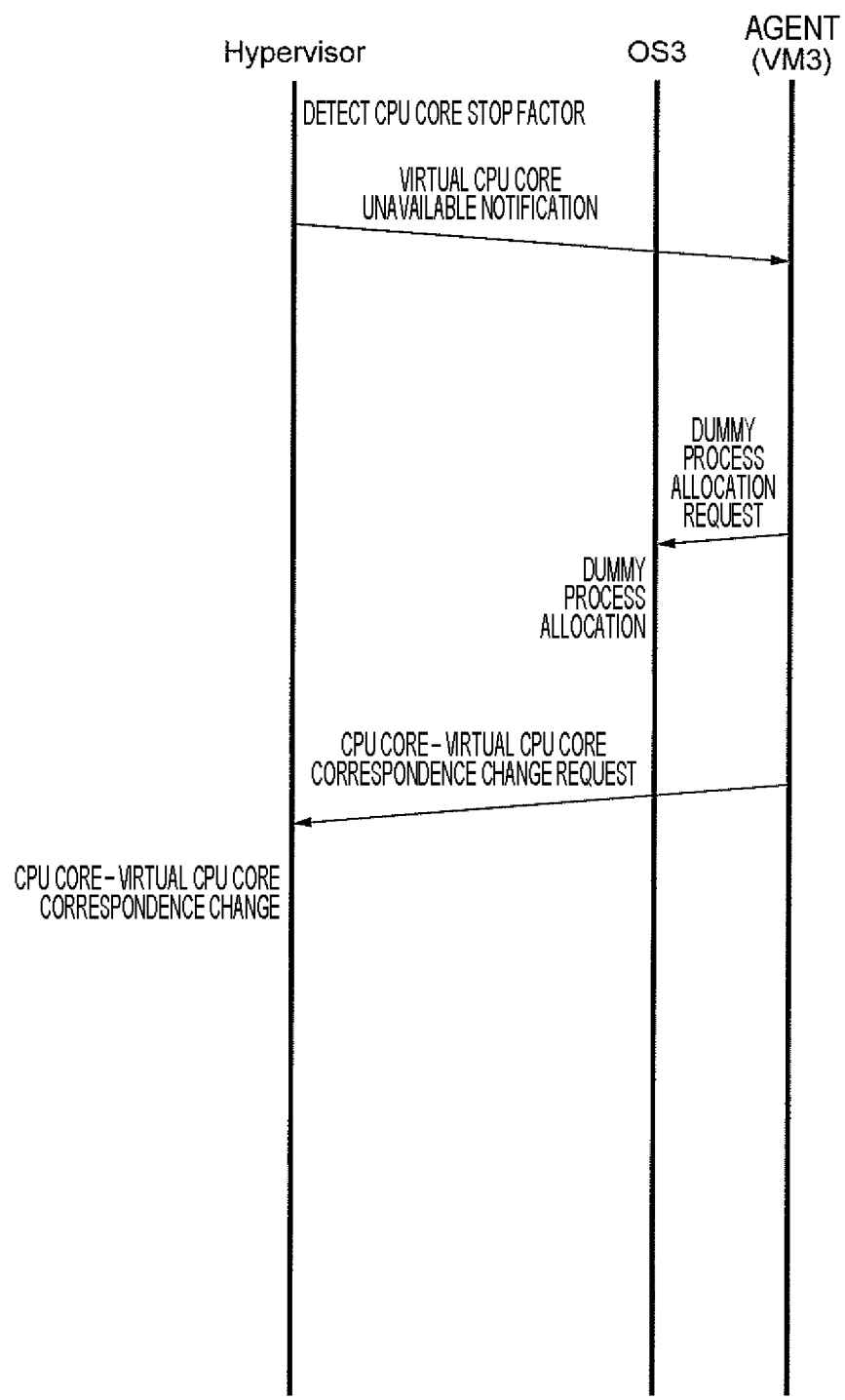
FIG. 35 is a sequence chart illustrating operations of an agent 153, an OS 151, and the hypervisor 12 in the fifth embodiment.

FIG. 35 is a sequence chart illustrating operations of the agent 153, the OS 151, and the hypervisor 12 in the fifth embodiment. This corresponds to YES in Step S350, YES in S355, S102, S105, and S360, and S365 from the top to the bottom.

FIG. 36 is a configuration diagram illustrating a management table 122 in the hypervisor 12 in the fifth embodiment. FIG. 36 illustrates a configuration after the CPU core 1011 becomes unavailable. The CPU core (CPU core 1) 1011 is deleted from the CPU core-virtual CPU core correspondence table 1221.

Figure 37:
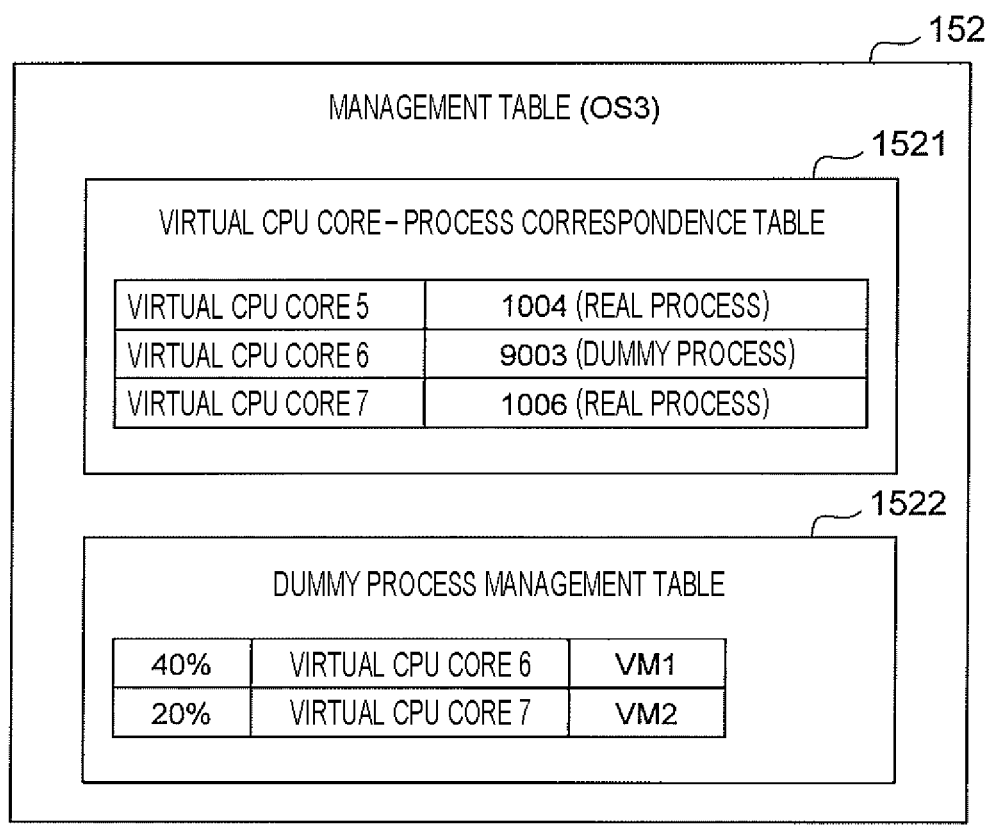
FIG. 37 is a configuration diagram illustrating a management table 152 in the OS 151 in the fifth embodiment.

FIG. 37 is a configuration diagram illustrating a management table 152 in the OS 151 in the fifth embodiment. FIG. 37 illustrates a configuration after the CPU core 1011 becomes unavailable. The process 9003 (dummy process 154a) is allocated to the virtual CPU core (virtual CPU core 6) 1236.

FIGS. 38 to 43 are diagrams illustrating variations of the fifth embodiment and other modifications examples. In the modification examples illustrated in FIGS. 38 to 43, after another CPU core is made free, a virtual CPU core of which allocation has been temporarily cancelled due to failure or the like is allocated to the empty CPU core.

Figure 38:
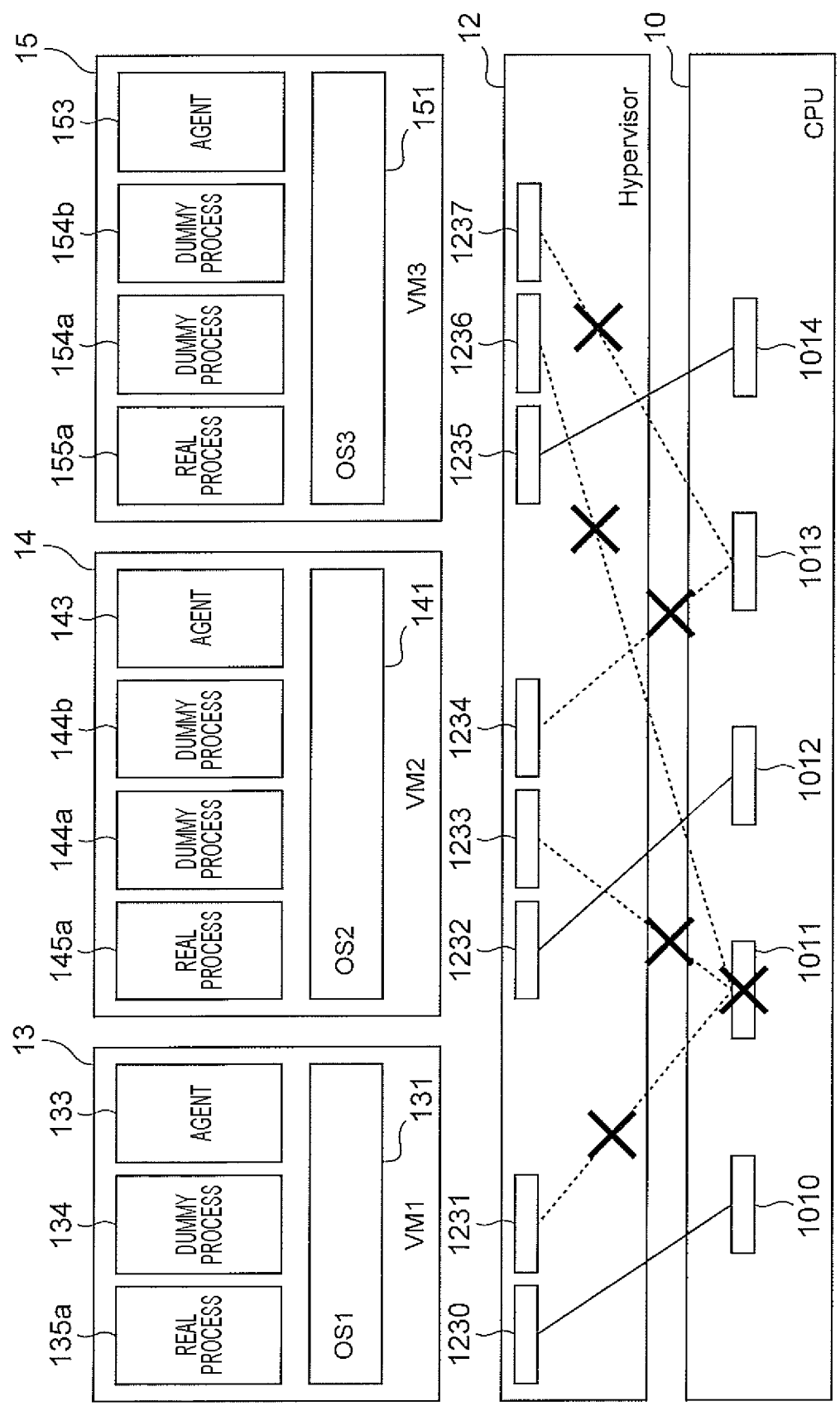
FIG. 38 is a diagram illustrating a functional configuration in a modification example of the fifth embodiment.

FIG. 38 is a diagram illustrating a functional configuration in the modification example of the fifth embodiment. FIG. 38 illustrates a state in which, in accordance with the sequence similar to that in FIG. 35, the state illustrated in FIG. 32 is changed, and the association of the CPU core 1013 with the virtual CPU cores 1234 and 1237 is cancelled.

Figure 39:
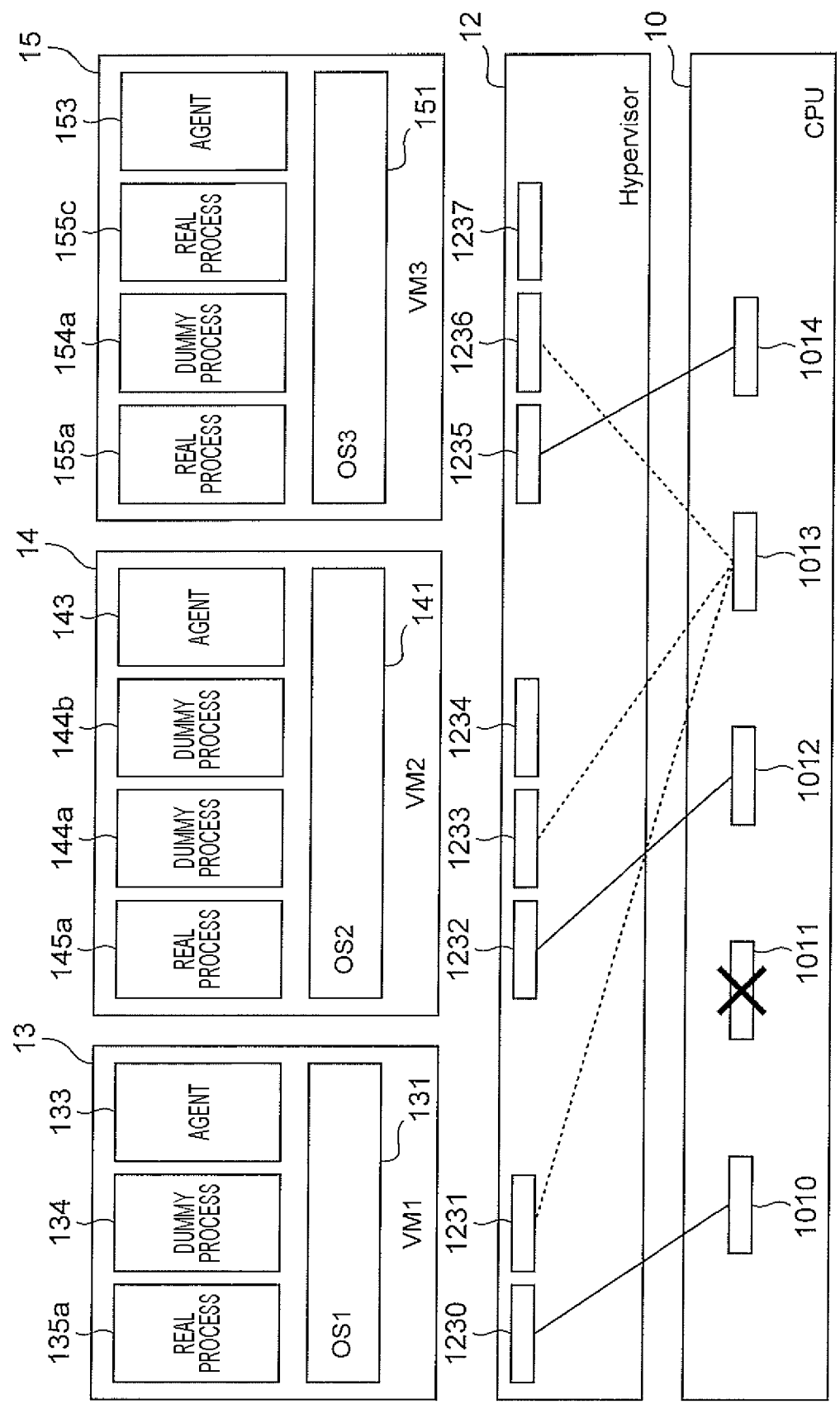
FIG. 39 is a diagram illustrating the functional configuration in the modification example of the fifth embodiment.

FIG. 39 is a diagram illustrating the functional configuration in the modification example of the fifth embodiment. FIG. 39 illustrates a state in which the association of the CPU core 1013 with the virtual CPU cores 1231, 1233, and 1236 is set (restored) from the state in FIG. 38.

Figure 40:
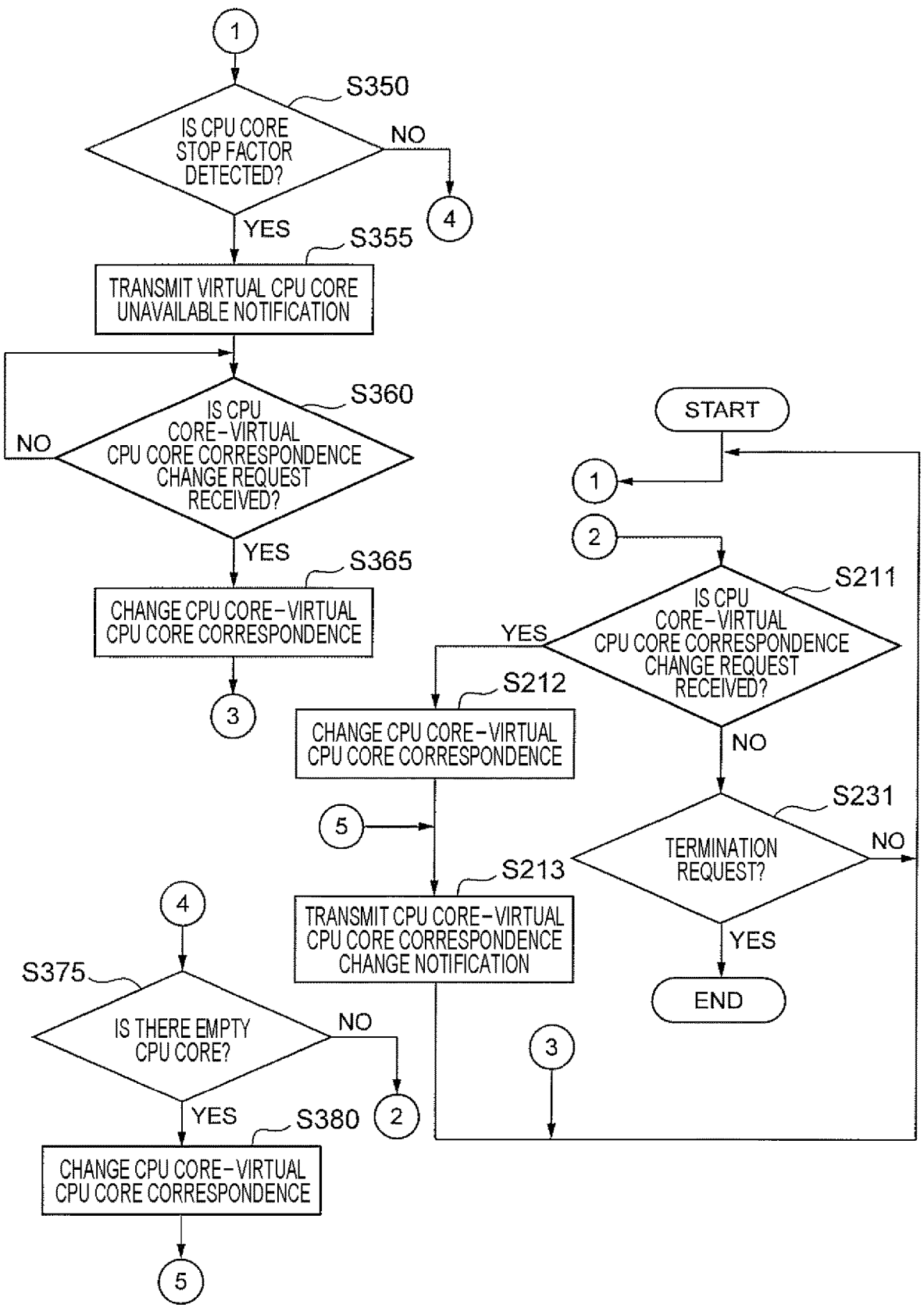
FIG. 40 is a flowchart illustrating the processing contents of the hypervisor 12 in the fifth embodiment.

FIG. 40 is a flowchart illustrating processing contents of the hypervisor 12 in the fifth embodiment. A difference between FIG. 33 and FIG. 40 is that Step S375 and Step S380 are executed after NO in Step S350. In Step S375, an empty CPU core (CPU core 1013 in the example in FIG. 38) is detected. In Step S380, the CPU core-virtual CPU core correspondence is changed. The processing content here is the processing content obtained by adding a to the first half of Step S212. That is, the detected empty CPU core is stored for the virtual CPU core of which the association on the CPU core-virtual CPU core correspondence table 1221 is desired to be restored. One (virtual CPU core (virtual CPU core 1) 1231 in FIG. 42 described later) of the virtual CPU cores is selected, and the allocation rate is changed from 0% to 100%. Then, the processing is continued from Step S213.

Figure 41:
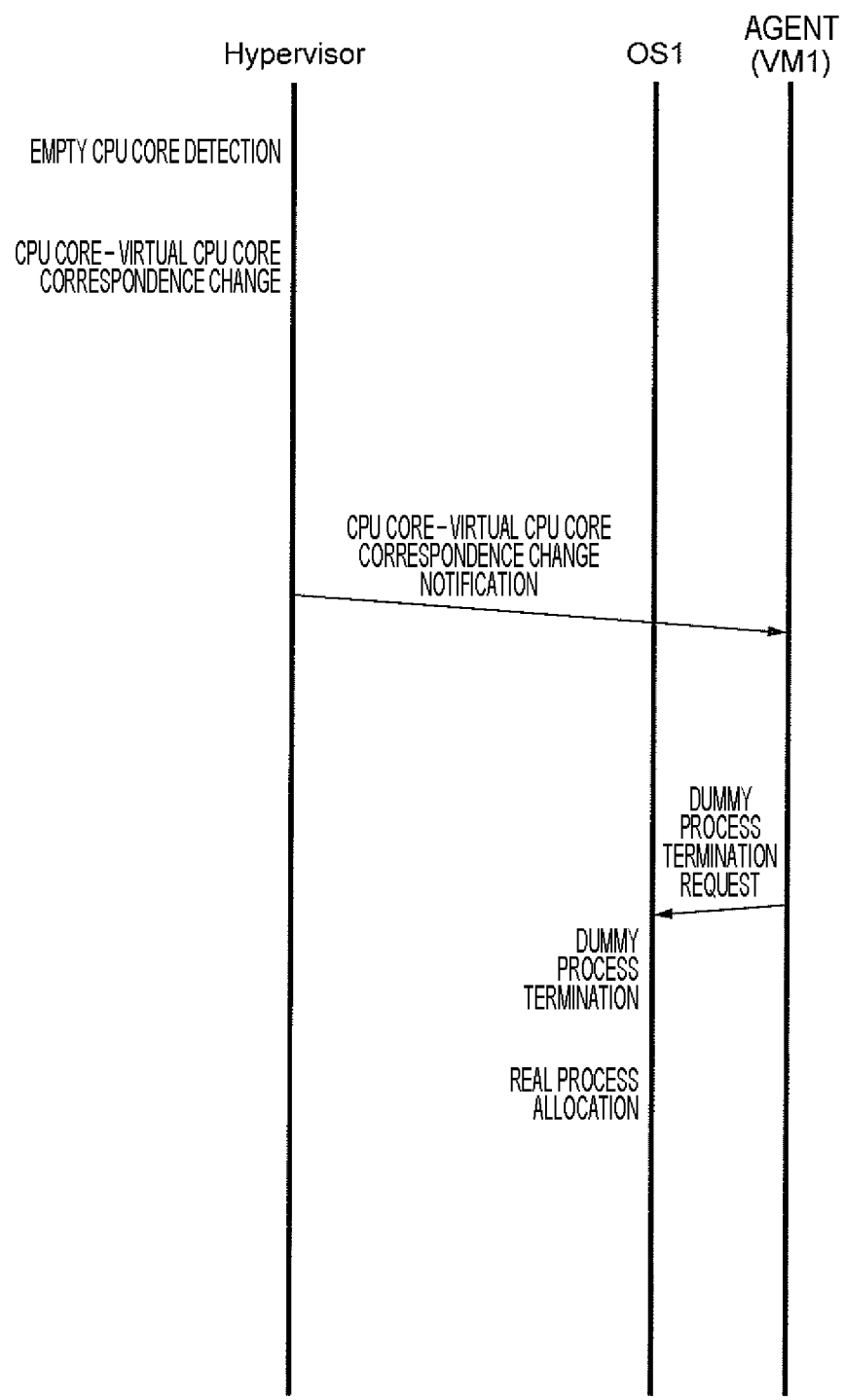
FIG. 41 is a sequence chart illustrating operations of an agent 133, an OS 131, and the hypervisor 12 in the fifth embodiment.

FIG. 41 is a sequence chart illustrating operations of the agent 133, the OS 131, and the hypervisor 12 in the fifth embodiment. This corresponds to YES in Step S375, YES in S380, S213, and S111, and S115 from the top to the bottom.

FIG. 42 is a configuration diagram illustrating the management table 122 in the hypervisor 12 in the fifth embodiment. FIG. 42 illustrates a configuration after the CPU core 1013 (CPU core 3) made empty is associated with the virtual CPU core associated before the CPU core 1011 becomes unavailable, and the allocation rate of the virtual CPU core (virtual CPU core 1) 1231 is set to 100%.

Figure 43:
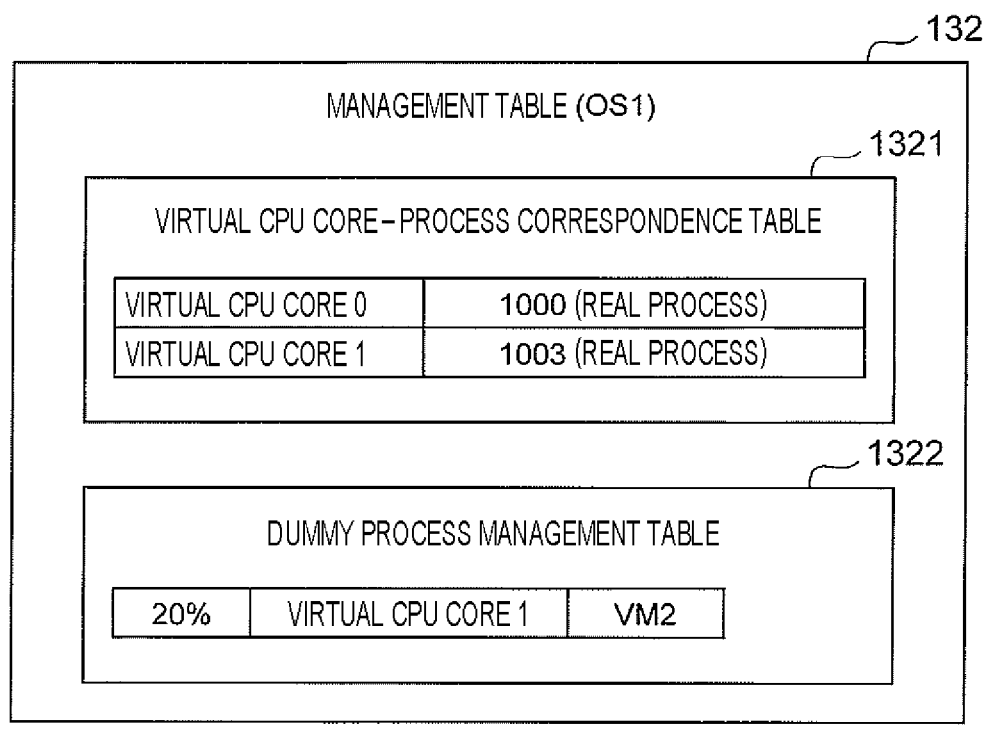
FIG. 43 is a configuration diagram illustrating a management table 132 in an OS 131 in the fifth embodiment.

FIG. 43 is a configuration diagram illustrating the management table 132 in the OS 131 in the fifth embodiment. FIG. 43 illustrates a configuration after the CPU core (CPU core 3) 1013 becomes available. The process 1003 (real process 135a) is allocated to the virtual CPU core (virtual CPU core 1) 1231.

Hitherto, although the embodiments of the present invention have been described in detail above, the present invention is not limited to the above-described embodiments, and various design changes can be made without departing from the spirit of the present invention described in the claims. For example, the above embodiments are described in detail in order to explain the present invention in an easy-to-understand manner, and the above embodiments are not necessarily limited to a case including all the described configurations. Further, some components in one embodiment can be replaced with the components in another embodiment, and the configuration of another embodiment can be added to the configuration of one embodiment. Further, regarding some components in the embodiments, other components can be added, deleted, and replaced.

REFERENCE SIGNS LIST

1 ECU (control device)
10 CPU (arithmetic processing unit)
12 hypervisor
13 virtual machine (VM1)
14 virtual machine (VM2)
133, 143, 153 agent
134, 144, 154 dummy process

The invention claimed is:

1. An embedded hypervisor that operates a plurality of virtual machines in an arithmetic processing device including a plurality of CPU cores, wherein
the embedded hypervisor
associates a plurality of virtual machines with one first CPU core among the plurality of CPU cores, and
allocates a use time of the first CPU core to only one first virtual machine among the plurality of virtual machines, wherein when ratios of loads of the plurality of virtual machines have changed, it is determined whether or not to receive a correspondence change request for switching the virtual machine to which the use time of the first CPU core is exclusively given, and when the correspondence change request is received, a process of preventing allocation of a certain process of an OS to a virtual CPU core corresponding to the first CPU core is executed before switching of the virtual machine is performed, the OS being in the virtual machine to which the use time of the first CPU core is not allocated.

2. The embedded hypervisor according to claim 1, wherein the process of prevention is executed by executing a dummy process with an OS in the virtual machine to which the use time of the first CPU core is not allocated.

3. The embedded hypervisor according to claim 1, wherein, in the process of prevention, association of CPU core allocation setting for all processes of the OS in the virtual machine to which the use time of the first CPU core is not allocated, with the virtual CPU core corresponding to the first CPU core is prevented.

4. A control device comprising:
a CPU;
an embedded hypervisor executed by the CPU; and
a plurality of virtual machines executed by the embedded hypervisor,
wherein the embedded hypervisor
associates one CPU core of the CPU with programs in the plurality of virtual machines in an executable manner,
allocates the CPU core to only one virtual machine among the plurality of virtual machines, and
switches the virtual machine to which the CPU core is to be allocated, to another virtual machine in accordance with a load of each of the plurality of virtual machines,
wherein the embedded hypervisor
causes the virtual machine to which the CPU core is allocated to execute a dummy process when a load of the virtual machine to which the CPU core is allocated is lower than a threshold value, and
switches the virtual machine to which the CPU core is to be allocated, from the virtual machine to which the CPU core is allocated, to another virtual machine in a state where the dummy process is executed.

5. The control device according to claim 4, wherein
when the load of the virtual machine to which the CPU core is allocated is lower than the threshold value, the virtual machine to which the CPU core is allocated executes a dummy process and transmits, to the hypervisor, a correspondence change request for switching the virtual machine to which the CPU core is to be allocated, to other virtual machine,
if the hypervisor receives the correspondence change request from the virtual machine to which the CPU core is allocated, the hypervisor transmits a correspondence change notification for a notification that the CPU core is allocated, to the other virtual machine, and
if the other virtual machine receives the correspondence change notification from the hypervisor, the other virtual machine terminates the dummy process under execution and executes a real process with the CPU core.

6. The control device according to claim 5, wherein
when the load of the virtual machine to which the CPU core is allocated is lower than the threshold value, the virtual machine to which the CPU core is allocated executes a dummy process and transmits a CPU core available notification for a notification that the CPU core is available, to other virtual machine associated with the same CPU core as the virtual machine, and
the other virtual machine terminates the dummy process under execution and executes a real process by using the CPU core.

7. The control device according to claim 5, wherein
when a load of the virtual machine to which the CPU core is allocated is higher than a threshold value, the virtual machine transmits a CPU use request for requesting a use of a CPU core to other virtual machine associated with the same CPU core as the virtual machine, and
the other virtual machine that receives the CPU use request executes a dummy process when a load of the other virtual machine is not overload.

* * * * *